(12) United States Patent
Lee et al.

(10) Patent No.: US 8,131,297 B2
(45) Date of Patent: Mar. 6, 2012

(54) METHOD FOR ACQUIRING INFORMATION FOR MEDIA INDEPENDENT HANDOVER

(75) Inventors: Jin Lee, Gyeonggi-do (KR); Yong Ho Kim, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 261 days.

(21) Appl. No.: 12/373,886

(22) PCT Filed: Jul. 13, 2007

(86) PCT No.: PCT/KR2007/003419
§ 371 (c)(1), (2), (4) Date: May 29, 2009

(87) PCT Pub. No.: WO2008/010655
PCT Pub. Date: Jan. 24, 2008

(65) Prior Publication Data
US 2009/0298504 A1    Dec. 3, 2009

(30) Foreign Application Priority Data

| Jul. 15, 2006 | (KR) | 10-2006-0066631 |
| Nov. 10, 2006 | (KR) | 10-2006-0111268 |
| Jan. 12, 2007 | (KR) | 10-2007-0004004 |
| Mar. 9, 2007 | (KR) | 10-2007-0023532 |

(51) Int. Cl.
*H04W 36/00* (2009.01)
(52) U.S. Cl. ...... 455/437; 455/436; 455/422.1; 455/423.1; 455/432.3; 455/456.2

(58) Field of Classification Search ........... 455/436, 455/437, 422.1, 423.1, 432.3, 456.2; 370/331, 370/328, 335, 338, 341, 348
See application file for complete search history.

(56) References Cited

U.S. PATENT DOCUMENTS

| 7,684,342 B2* | 3/2010 | Gupta et al. ............ 370/252 |
| 2005/0208945 A1* | 9/2005 | Hong et al. ............ 455/436 |
| 2005/0249161 A1 | 11/2005 | Carlton |
| 2006/0099948 A1 | 5/2006 | Hoghooghi et al. |
| 2006/0187858 A1* | 8/2006 | Kenichi et al. ........ 370/254 |
| 2006/0217147 A1* | 9/2006 | Olvera-Hernandez et al. ........ 455/552.1 |
| 2006/0230151 A1 | 10/2006 | Kim et al. |
| 2006/0251020 A1* | 11/2006 | Olvera-Hernandez et al. ........ 370/331 |

FOREIGN PATENT DOCUMENTS

| JP | 2009527142 | 7/2009 |
| WO | 2006/001902 | 1/2006 |
| WO | 2006/052563 A2 | 5/2006 |

\* cited by examiner

*Primary Examiner* — Kwasi Karikari
(74) *Attorney, Agent, or Firm* — Lee, Hong, Degerman, Kang & Waimey

(57) ABSTRACT

This document is related to a method for acquiring information for media independent handover. More specifically the method comprises: submitting a media independent handover (MIH) query to a base station (BS) by sending a first request message, and receiving a response to the MIH query. Because the first request message is used for authorization, preferably the PKM message, the MS can acquire information for handover between heterogeneous networks before the MS finishes the network entry.

12 Claims, 15 Drawing Sheets

METHOD FOR ACQUIRING INFORMATION FOR MEDIA INDEPENDENT HANDOVER

CROSS-REFERENCE TO RELATED APPLICATIONS

This application is the National Stage filing under 35 U.S.C. 371 of International Application No. PCT/KR2007/003419, filed Jul. 13, 2007, which claims the priority of Korean patent application Nos. 10-2006-0066631, filed Jul. 15, 2006, 10-2006-0111268, filed Nov. 10, 2006, 10-2007-0004004, filed Jan. 12, 2007 and 10-2007-0023532, filed Mar. 9, 2007.

TECHNICAL FIELD

This document relates to a method for acquiring information for media independent handover. And more particularly this document relates to a method for acquiring information for handover between heterogeneous networks, or a method for acquiring information which can be acquired from heterogeneous network information server comprising information from an upper layer of broadband wireless access system (ex, IEEE 802.16), while a multi-mode mobile terminal (or MS (Mobile station)) comprising two or more interfaces of wired and/or wireless interface (ex. IEEE 802.16 interface, IEEE 802.3 interface, IEEE 802.11 interface, or 3GPP/3GPP2 interface) is performing media independent handover (MIH).

BACKGROUND ART

IEEE 802.16e system which deals with an international standard for broadband wireless access system consisted only of MSS (Mobile Subscriber Station) as mobile station (MS), base station (BS) and ASA (Authentication Service Authorization), in contrast to 2G or 3G mobile communication system having hierarchical structure such as HLR, VLR, MSC, BSC, RNC, and so on. And, the IEEE 802.16e system defines common physical (PHY) layers and medium access control (MAC) layers in the BS and MSS.

Hereinafter, for convenience to explain, let 'MS' collectively refer to any one of mobile station, mobile subscriber station, subscriber station, and so on.

FIG. 1 shows an example of frame structure of OFDMA physical layer in the broadband wireless access system.

As show in the FIG. 1, a downlink subframe starts with a preamble for use in synchronization and equalization in the physical layer. And, the downlink subframe comprises downlink map (DL-MAP) message and uplink map (UL-MAP) message defining the location and usage of downlink and uplink bursts. So, the downlink subframe defines whole structure of the frame through the DL-MAP and the UL-MAP.

Tables 1 and 2 show an example of DL-MAP and UL-MAP.

TABLE 1

| Syntax | Size | Notes |
|---|---|---|
| DL-MAP_Message_Format( ) { | | |
| Management Message Type = 2 | 8 bits | |
| PHY Synchronization Field | variable | See appropriate PHY specification. |
| DCD Count | 8 bits | |
| BS ID | 48 bits | |
| Begin PHY Specific Section { | | See applicable PHY section. |

TABLE 1-continued

| Syntax | Size | Notes |
|---|---|---|
| for(i= 1; i <= n;i++) { | | For each DL-MAP element 1 to n. |
| DL-MAP_IE( ) | variable | See corresponding PHY specification. |
| } | | |
| } | | |
| if !(byte boundary) { | | |
| Padding Nibble | 4 bits | Padding to reach byte boundary. |
| } | | |
| } | | |

TABLE 2

| Syntax | Size | Notes |
|---|---|---|
| UL-MAP_Message_Format( ) { | | |
| Management Message Type = 3 | 8 bits | |
| Uplink Channel ID | 8 bits | |
| UCD Count | 8 bits | |
| Allocation Start Time | 32 bits | |
| Begin PHY Specific Section { | | See applicable PHY section. |
| for(i= 1; i <= n; i++) { | | For each UL-MAP element 1 to n. |
| UL-MAP_IE( ) | variable | See corresponding PHY specification. |
| } | | |
| } | | |
| if !(byte boundary) { | | |
| Padding Nibble | 4 bits | Padding to reach byte boundary. |
| } | | |
| } | | |

DL-MAP message, shown in the table 1, defines the usage of each burst for the downlink section in burst mode physical layer, and UL-MAP message, shown in the table 2, defines the usage of each burst for the uplink section.

Information elements (IEs) consisting the DL-MAP message includes DIUC (Downlink Interval Usage Code), CID (Connection ID) and location information of the burst (ex, subchannel offset, symbol offset, the number of subchannels and the number of symbols). And the location information of the burst makes user to identify a downlink traffic region.

And, IEs consisting the UL-MAP message include CID, UIUC (Uplink Interval Usage Code) and duration. The UIUC defines the usage of each the CID, and the duration defines the location of an allocated region. The usage of each region is defined by the UIUC used in the UL-MAP. And, each allocated region starts after the duration, defined in the UL-MAP IE, from the start position of previous region.

The above mentioned UIUC can be expressed as a following table 3.

TABLE 3

| UIUC | Usage |
|---|---|
| 0 | FAST-FEEDBACK Channel |
| 1-10 | Different burst profiles |
| 11 | Extended UIUC 2 IE |
| 12 | CDMA bandwidth request |
| 13 | PAPR reduction request |
| 14 | CDMA allocation IE |
| 15 | extended UIUC |

Specifically, table 3 indicates OFDMA UIUC, and this expresses the usage of uplink data burst. For example, in the OFDMA system, UIUC 1-10 is a region for data burst, and UIUC 12 is used for CDMA resource allocation.

And, a following table 4 shows an extended UIUC which corresponds to UIUC 15 of the table 3.

TABLE 4

| Extended UIUC | Usage |
| --- | --- |
| 00 | Power_control_IE |
| 01 | Mini-subchannel_allocation_IE |
| 02 | AAS_UL_IE |
| 03 | CQICH_Alloc_IE |
| 04 | UL_Zone_IE |
| 05 | PHYMOD_UL_IE |
| 06 | MIMO_UL_Basic_IE |
| 07 | UL_PUSC_Burst_Allocation_in_Other_Segment_IE |
| 08 | Fast_Ranging_IE |
| 09 | UL_Allocation Start IE |
| 0B . . . 0F | Reserved |

At present, as shown in the table 4, 10 extended UIUCs are presented by subcodes.

Based on the above explanation, the method for handover between heterogeneous networks can be explained as follows.

IEEE 802.21 which deals with the media independent handover (MIH) between heterogeneous networks has the purpose of improving convenience of a user by providing seamless handover and service continuity between heterogeneous networks. And, the basic requirements of the IEEE 802.21 are MIH function, event service (ES), command service (CS) and information service (IS).

The MS for the above system is a multi-mode node which supports one or more interface type. And, the interface type can be one or more of the followings.

Wire-line type interface such as 802.3 based ethernet
IEEE 802.XX based Wireless interface
802.11
802.15
802.16
Interface defined by a cellular standardization organization such as 3GPP and 3GPP2

FIG. 2 shows an example of the multi-mode MS capable of such handover between heterogeneous networks.

As shown in the FIG. 2, multi-mode MS comprises physical (PHY) layers and media access control (MAC) layers for the each mode. And, MIH function is a logical object, and can be located freely, because it can interface with each layer through service access point (SAP) in the protocol stack Media independent handover (MIH) should be defined between 802 type interfaces, or between 802 type interface and non 802 type interface. And, a protocol for supporting mobility of the upper layer, such as mobile IP and session IP, should be supported for handover and seamless service.

On the other hand, IEEE 802.21 standard has another purpose of making various handover methods, which can be classified as "break before make" or "make before break", and which can be performed efficiently. Media independent handover function (MIHF) provides an asymmetric service such as media independent event service (MIES) and a symmetric service such as media independent command service (MICS) through well defined service access point. Media independent handover technique is consisted of three MIHF services and MIH protocol. The three major MIHF services are MIES, MICS and media independent information service (MIIS).

Among the above, MIES deals with information which transported from link layer to upper layer, and the upper layer can receive this information by authentication process. Here, the upper layer comprising mobility management protocol may need to receive the link layer information such as information indicating the handover will be performed soon, or information indicating the handover was just finished, for predicting and helping the handover.

Further, MIES can be classified as a link event service, which deals with the link event starting from an object which generates an event in the lower layer (lower layer below the second layer) and generally ending in MIHF, and MIH event service, which deals with the MIH event transmitted to the upper layer (upper layer over the third layer) registered by the MIHF.

Again, the link event and the MIH event can be classified as two types according to the transmitted region. If the events are generated in the source of event in the local stack and are transmitted upward to local MIHF or the upper layers in the MIHF, these events can be called as 'local events'. And, if the events are generated in the remote MIHF and are transmitted to remote MIHF, or if the events are transmitted from the remote MIHF to the local MIHF, these events can be called as 'remote events'.

Next, MICS deals with the command transmitted from the upper layers (over the third layer) to the lower layers (below the second layer) for determining the link states between the upper layers and other MIH users, and for controlling the adjusted operation. And, MICS can be classified as link command service and MIH command service as like the MIES. The link command and MIH command also can be classified as 'local command' and 'remote command' according to the region transmitted. The local MIH command is generated in the upper layer and is transmitted to the MIHF (for example, MIHF in the upper layer mobility management protocol, or MIHF in the policy engine). The local link command is generated in the MIHF, and is transmitted to the lower layer (for example, media access control layer in the MIHF or physical layer in the MIHF), for controlling the lower layer. The remote MIH command is information generated in the upper layer and is transmitted to the equivalent layer in the remote stack. And, the remote link command is a command generated in the MIHF and transmitted to the lower layer lower than the equivalent layer in the remote stack.

Finally, the MIIS provides similar frame work in the heterogeneous networks for detecting and selecting present various type networks. That is, the MIIS provides detailed information about the network for detecting and selecting the networks, and it should be accessed from any network. And, the MIIS comprises the following information elements.

Link access parameter

Security mechanism

Neighbor Map

Location

Provider and other Access Information

Cost of link

As an example of the above information service, there is a MIH_Get_Information.request/response primitive provided by the MIH of the MS, and tables 5 and 6 show the format of these primitives.

TABLE 5

| Name | Type | Valid Range | Description |
| --- | --- | --- | --- |
| InfoQuery Type | An integer value corresponding to one of the following:<br>1: TLV<br>2: RDF_DATA<br>3: RDF_SCHEMA_URL<br>4: RDF_SCHEMA | N/A | The type of query that is specified |
| InfoQuery Parameters | Query type specific parameters | N/A | Query type specific parameters which indicate the type of information the client may be interested in. |

TABLE 6

| Name | Type | Valid Range | Description |
| --- | --- | --- | --- |
| InfoQuery Type | An integer value corresponding to one of the following:<br>1: TLV<br>2: RDF_DATA<br>3: RDF_SCHEMA_URL<br>4: RDF_SCHEMA | N/A | The type of query that is specified |
| MIH_REPORT | String | N/A | Report consisting of information requested by the MIH User. |
| Status | Enumerate | N/A | Specifies whether the information was successfully retrieved or not. |

FIG. 3 shows a process of adjusting uplink parameters by a MS through an initial ranging before the MS finishes the network registration.

Each step of the FIG. 3 is described in the following.

A MS acquiring downlink synchronization and information for uplink channel through DL-MAP, UCD, DCD (steps (1)-(2)). Then, the MS scans the UL-MAP, confirms the interval for the initial ranging, randomly selects a code, and transmits the selected code to the BS (steps (3)-(5)).

When the BS sets the backoff window for the initial ranging in the UCD message for protecting the collision of the ranging codes, the MS waits a randomly selected amount of time in that backoff window, and then transmits the code again. Here, when the MS does not receive the reply to the ranging code transmitted by the MS from the BS until the T3 timer expires, the MS increases the backoff window size up to the twice, and transmits another code to the BS (steps (6)-(7)).

When the MS receives the 'continue' as a ranging state and the code parameter transmitted in the RNG-REQ message, the MS readjusts uplink parameters by the parameters in the RNG-RSP message. By repeating the transmitting code and receiving RNG-RSP message until the ranging state becomes 'success', the MS finishes adjusting uplink parameters such as time, power, frequency for the uplink, and the BS allocates bandwidth by the CDMA allocation IE when transmitting UL-MAP for the mobile station to transmit RNG-REQ message (steps (8)-(11)).

Then, the MS transmits RNG-REQ message comprising MAC address and MAC version through the allocated bandwidth (step (12)). And, the BS transmits to the mobile station the RNG-RSP message allocating basic CID and primary CID to the mobile station as an initial ranging CID (step (13)).

On the other hand, a periodic ranging is performed after finishing the network entry process by the MS with the BS, so the periodic ranging has the process same to the process of initial ranging except excluding the steps of (12) and (13).

Total 256 ranging codes are consisted of domains for initial ranging, periodic ranging, bandwidth request ranging and handover ranging, and the MS selects a code in each domain.

DISCLOSURE

Technical Problem

In the above mentioned conventional technique, for the multi-mode terminal to acquire information for heterogeneous network, only a method independent from the media can be considered. That is, in the conventional technique, the MS only can acquire information for the heterogeneous network using data packet after finishing the entry process to the network intended to access through the initial ranging and finishing the authentication process, as described above regarding the FIG. 3.

Therefore, the technique for acquiring information for heterogeneous network intended to access, before finishing the entry process to the network is required.

Technical Solution

To achieve these objects and other advantages of the present invention, as embodied and broadly described herein, a method for acquiring information for media independent handover (MIH) by a mobile station (MS), the method comprises submitting a media independent handover (MIH) query to a base station (BS) by sending a first request message, and receiving a response to the MIH query, where the first request message is used for authorization. Because the MS can transmit the MIH query using the first request message used for authentication, the MS can acquires information for MIH handover before finishing the authentication process.

Preferably, the first request message can be a privacy key management (PKM) request message.

More preferably, the step of receiving the response to the MIH query can comprise receiving a first response message comprising 'cycle' information, and receiving a second response message comprising the response to the MIH query. Here, the cycle information can indicate when the response to the MIH query is ready for delivery to the MS. By transmitting this cycle information before transmitting the response to the MIH query, the BS can acquire time for acquiring information from information server.

Still more preferably, the first response message can further comprise a query identifier (ID) and delivery method information, wherein the query ID is used by the MS to correlate the MIH query with the response to the MIH query, and wherein the delivery method information indicates a delivery method, such as multicast method or unicast method, that is used by the BS. According to the above mentioned delivery method, receiving the second response message can differently defined.

First, when the delivery method information indicates the delivery method used by the BS is the unicast delivery method, the receiving the second response message can comprise receiving a uplink map information for allocating bandwidth in a MAC frame indicated by the cycle information, transmitting a second request message that indicates continued presence of the MS, and receiving the second response message comprising the response to the MIH query, here, the second response message a message used for authorization, such as PKM-RSP message.

On the other hand, when the delivery method information indicates the delivery method used by the BS is the broadcast delivery method, the receiving the second response message can comprise receiving the second response message comprising the response to the MIH query in a MAC frame indicated by the cycle information, and here, the second response message is used for broadcasting a list of network service provider (NSP) identifiers, such as service identity information (SII) message.

Still more preferably, if the messages used in the above mentioned method according to the embodiments of this invention is described more specifically, the first request message (for example, PIM-REQ message), the first response message (for example, PKM-RSP message), and the second response message (for example, PKM-RSP or SII-ADV message according to the delivery method) may be indicated by a PKM message codes, and each of the PKM message codes may be indicates MIH initial request, MIH acknowledge (or can be called 'MIH initial response'), or MIH comeback response (see, table 36 in the following description). And, the first request message (ex, PKM-REQ) may comprise a MIH function (MIHF) frame type information, a delivery method and status code, and a MIHF frame (see, table 37 in the following description). Here, the delivery method and status code may be used by the MS and the BS to negotiate a preferred delivery method. And, the second response message comprises a MIH function (MIHF) frame type information, the query ID, a delivery method and status code, and a MIHF frame. Here, the query ID may be used by the MS to correlate the response to the MIH query with the MIH query.

Still more preferably, before the submitting the MIH query to the BS, the method can further comprise transmitting a basic capability request message (ex, SBC-REQ message), and receiving a basic capability response message (ex, SBC-RSP message), wherein the basic capability request message and the basic capability response message comprise information for indicating whether a MIH capability supported or not.

Still more preferably, the first request message may comprise a MIH function (MIHF) frame encapsulating the MIH query. Because the MIHF frame encapsulates the MIH query which can be received from the upper layer of the MS, the MAC of the MS need not performing any operation excepting encapsulating the MIH query, so it can be efficiently handle the MIH query.

In another aspect of the present invention, there is provided a method for delivering information for media independent handover (MIH) by a base station (BS), the method comprises receiving a first request message comprising a media independent handover (MIH) query from a mobile station (MS), and transmitting a response to the MIH query. This method can be other aspect of this invention, which is in the view of the BS.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
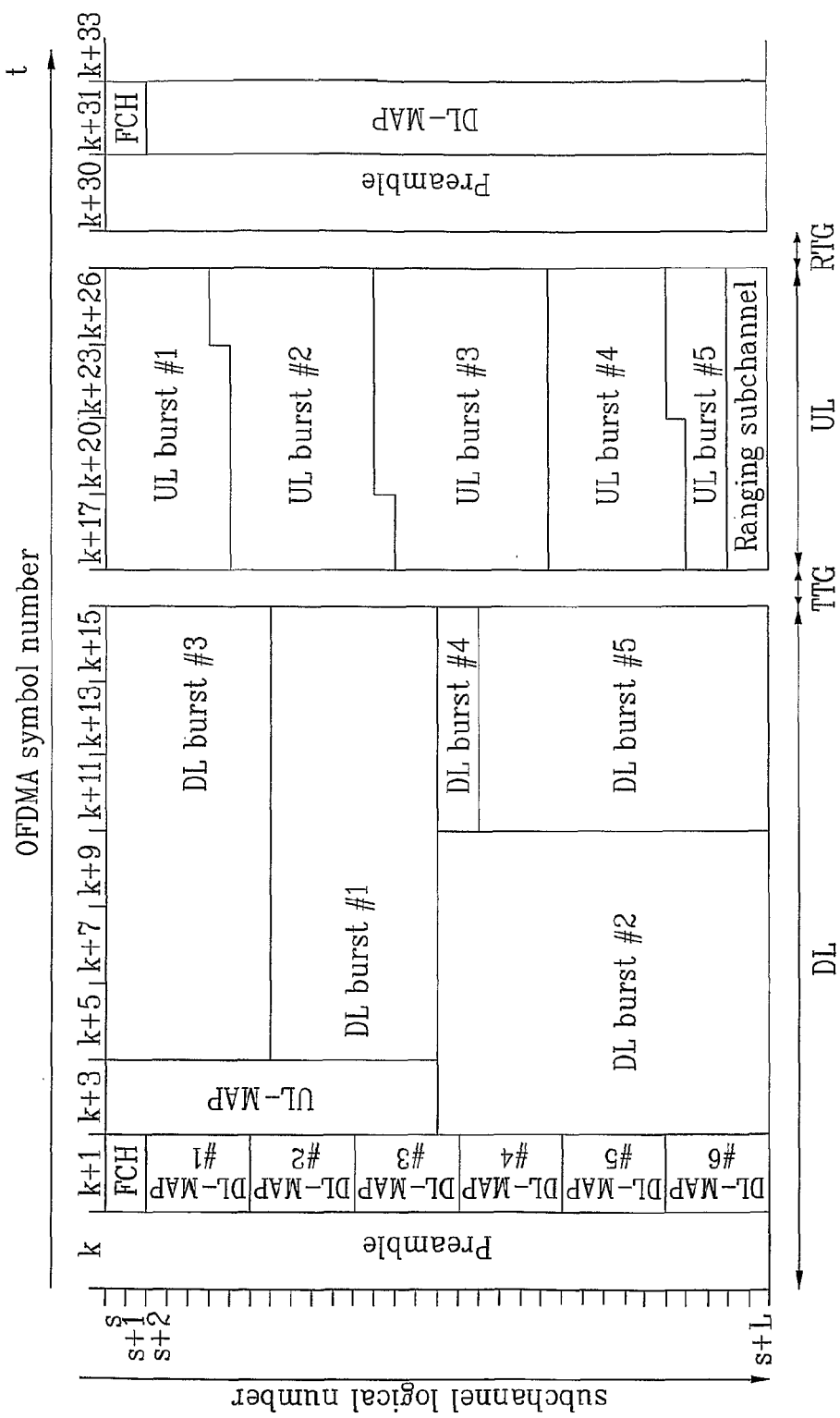
FIG. 1 shows an example of frame structure of OFDMA physical layer in the broadband wireless access system.
Figure 2:
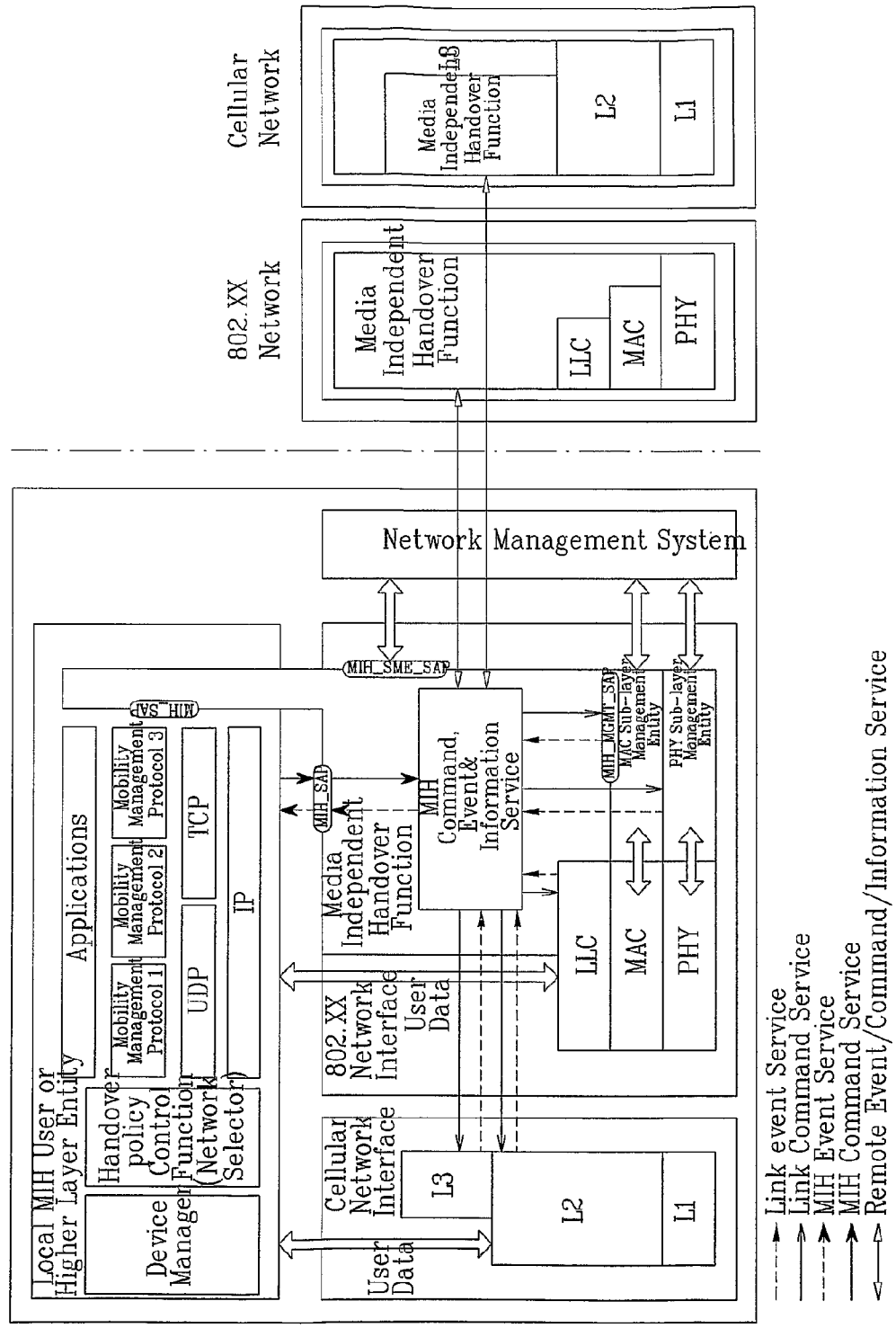
FIG. 2 shows an example of the multi-mode MS capable of such handover between heterogeneous networks.
Figure 3:
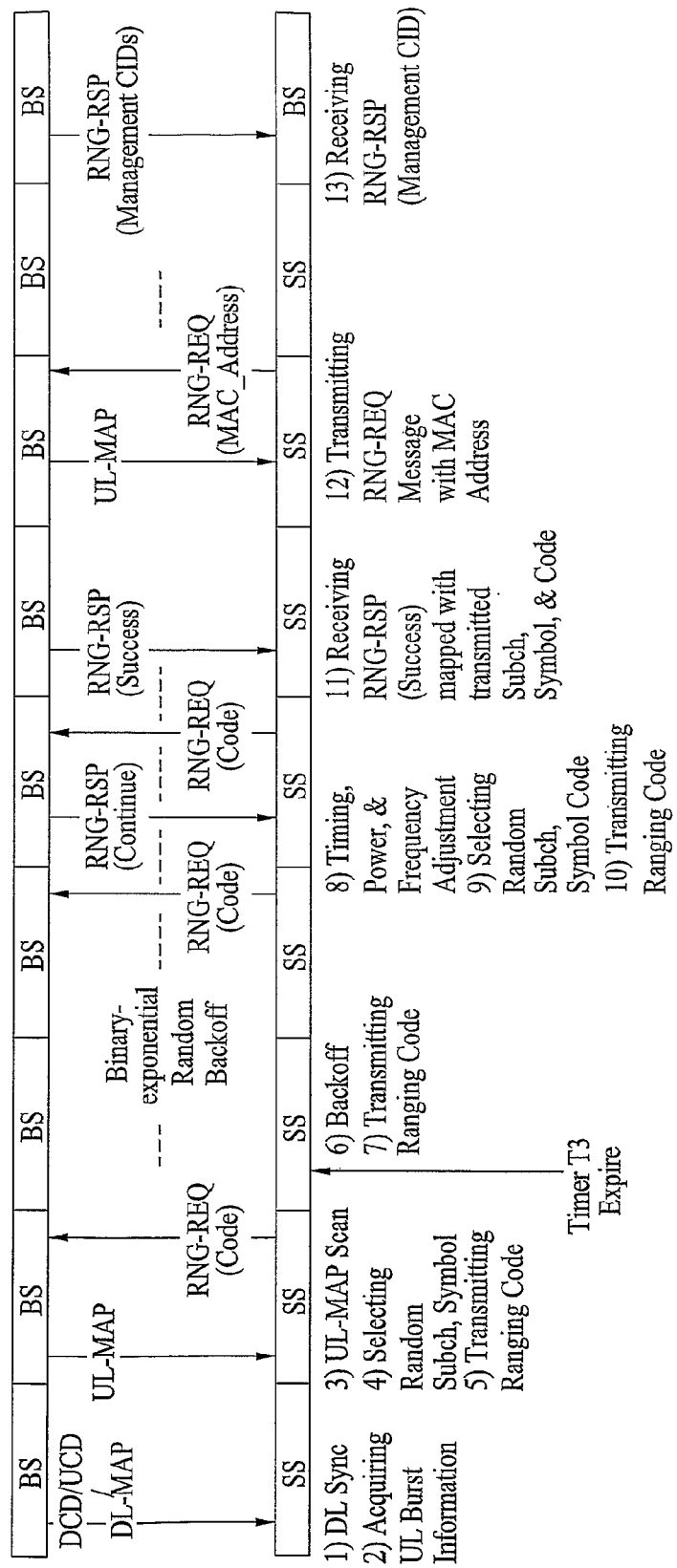
FIG. 3 shows a process of adjusting uplink parameters by a MS through an initial ranging before the MS finishes the network registration.

Reference will now be made in detail to the preferred embodiments of the present invention, examples of which are illustrated in the accompanying drawings.

First, parameters which should be added and/or modified for supporting the method for acquiring information for media independent handover by this invention will be described as follows.

A DCD message and a UCD message are the MAC management messages comprising uplink/downlink channel parameters of the BS, and the BS broadcasts this message periodically to the MSs. And, the MSs acquire information about the coding and modulation scheme of each burst from the DCD/UCD message, and perform coding/decoding of the data through this.

And, when the MS receives the DCD/UCD message periodically transmitted, the MS also determines whether the channel parameters are changed. And, when the parameters are changed, the MS updates the changed parameters received through the DCD/UCD message. UCD message defines profile information concerning coding and modulation scheme of uplink burst, as well, defines CDMA code group concerning ranging and bandwidth request and backoff time applied when the collision happened after transmission of the code by the MS, and so on.

On the other hand, the MS compares the configuration change count value to the DCD count value in the DL-MAP message. If the two values are different from each other, the MS notices that the DCD message has been changed. And, if the two values are same, the MS notices that the DCD message is same to the DCD message previously received.

Table 7 shows an example of the DCD message.

TABLE 7

| Syntax | Size | Notes |
|---|---|---|
| DCD_Message_Format( ) { | | |
| Management Message Type = 1 | | 8 bits |
| Downlink channel ID | | 8 bits |
| Configuration Change Count | | 8 bits |
| TLV Encoded information for the overall channel | Variable | TLV specific |
| Begin PHY Specific Section { | | |
|    For (i = 1; i<=n; i++) { | | For each downlink burst profile 1 to n |
|       Downlink_Burst_Profile | | PHY specific |
|    } | | |
| } | | |
| } | | |

And, table 8 show an example of TLV encoding inserted in the DCD message, for indicating the MIH capability of the BS.

TABLE 8

| Name | Type | Length | Value | PHY Scope |
|---|---|---|---|---|
| MIH Capability Support | 55 | 1 | 0 = MIH Capability not supported<br>1 = MIH Capability supported | All |

And, table 9 shows parameters added according to one embodiment of this invention, for including MIHF service supported by the object supporting MIHF in the DCD channel encoding.

TABLE 9

| Name | Type | Length | Value | PHY Scope |
|---|---|---|---|---|
| MIH Function | 55 | 1 | 0 = do not support MIF function.<br>1 = support MIH function. | ALL |
| MIH Capability | 55 | 2 | 01 = support ES<br>02 = support CS<br>03 = support IS | |

Here, the MIH function indicates whether the BS can perform the MIH function or not, the MIH capability indicates that the BS supports the ES (event service), CS (command service), IS (information service).

There can be a case that MIH capability field values exist, even when the MIH function value is 0. This case indicates that there is some object which can perform the MIH function in the neighboring region to the BS.

Table 10 shows another example of TLV encoding inserted in the DCD message or SBC-REQ/RSP message. And, when this TLV encoding is inserted in the DCD message or SBC-RSP message, this TLV is for indicating the MIH capability of the BS.

TABLE 10

| Name | Type | Length | Value | PHY Scope |
|---|---|---|---|---|
| MIH Capability Support | 55 | 1 | Setting bit # 0 to 1 indicates MIH services indicated through bit #1~3 are supported by the current BS. Setting more than one of bit #1~3 without setting bit #0 indicates existence of an MIH service entity within the Layer 2 broadcast domain of the current BS. In this case transport MIH MAC management message (MOB_MIH-MSG) is not supported by the BS. Bit #0 = MIH support Bit #1 = Event Service support Bit #2 = Command Service support Bit #3 = Information Service support Bit #4 = Information Service support during network entry. If Bit#4 is set as 1, 802.21 information service can be provided through PKM-REQ message. Bit #5 = ES/CS Capability discovery support during network entry Bit #5~7: reserved | All SBC-REQ SBC-RSP |

According to one embodiment of this invention, as shown in the table 10, if the MIH capability support parameter indicates that the information service is supported during network entry, the 802.21 information service can be provided through privacy key management (PKM) message.

In the OFDMA system of the broadband wireless access system, the ranging request and the uplink bandwidth request for the MS to adjust the uplink parameters is performed using the CDMA code.

The BS broadcasts the CDMA code group for the ranging and the bandwidth request through UCD message, the MS randomly selects a ranging code according to the purpose of the ranging among the CDMA codes acquired by the UCD message, and transmits the selected code through the allocated uplink region.

Table 11 shows an example of the UCD message.

TABLE 11

| Syntax | Size | Notes |
|---|---|---|
| UCD_Message_Format( ) { | | |
| Management Message Type = 0 | 8 bits | |
| Configuration Change Count | 8 bits | |
| Ranging Backoff Start | 8 bits | |
| Ranging Backoff End | 8 bits | |
| Request Backoff Start | 8 bits | |
| Request Backoff End | 8 bits | |
| TLV Encoded information for the overall channel | variable | TLV specific |
| Begin PHY Specific Section { | | See applicable PHY section. |
| for(i= 1; i <= n; i++) { | | For each uplink burst profile 1 to n. |
| Uplink_Burst_Profile | variable | PHY specific |
| } | | |
| } | | |
| } | | |

The following physical channel encoding can be inserted as a TLV in the above mentioned UCD message. The MS transmits this together with parameters for request for contention based ranging and information concerning the ranging code group.

Table 12 shows an example of the above mentioned physical channel encoding.

TABLE 12

| Name | Type (1 byte) | Length | Value |
|---|---|---|---|
| Bandwidth request opportunity size | 157 | 2 | Size (in units of PS) of PHY payload that SS may use to format and transmit a bandwidth request message in a contention request opportunity. The value includes all PHY overhead as well as allowance for the MAC data the message may hold. |
| Contention ranging request opportunity size | 158 | 2 | Size (in units of PS) of the transmission opportunity that an SS may use to transmit a RNG-REQ message in a contention ranging request opportunity. The value includes all PHY overhead as well as the maximum SS/BS round trip propagation delay. |
| Contention ranging request burst size | 159 | 2 | Size (in units of PS) of PHY bursts that an SS shall use to transmit a RNG-REQ message in a contention ranging request opportunity. |
| Subchannelized Initial Ranging capable BS | 152 | 1 | Indicator that the BS is capable of receiving of subchannelized Initial Ranging request (see 8.3.7.2). Value 0 (default) indicates the BS is not capable of receiving subchannelized Initial Ranging Request. Value 1 indicates the BS is capable of receiving subchannelized Initial Ranging Request. |

TABLE 12-continued

| Name | Type (1 byte) | Length | Value |
|---|---|---|---|
| | | | All subchannelization capable BSs shall be capable of receiving the subchannelized Initial Ranging Request. Values 2-255 are reserved. |
| Contention ranging request opportunity size | 153 | 2 | Size (in units of PS) of the transmission opportunity that an SS may use to transmit a RNG-REQ message in a contention ranging request opportunity. The value includes all PHY overhead as well as the maximum SS/BS round trip propagation delay. |
| Contention ranging request burst size | 154 | 2 | Size (in OFDM symbols) of PHY bursts that an SS shall use to transmit a RNG-REQ message in a contention ranging request opportunity. Default value: 4. |
| Start of ranging codes group | 155 | 1 | Indicates the starting number, S, of the group of codes used for this uplink. If not specified, the default value shall be set to zero. All the ranging codes used on this uplink will be between S and ((S + Q + N + M + L) mod 256). Where, N is the number of initial ranging codes. M is the number of periodic ranging codes. L is the number of bandwidth request codes. O is the number of handover ranging codes. The range of values is $0 \leq S \leq 255$. |

Here, the above "8.3.7.2" indicates subsection of IEEE 802.16e standard D-5 version. And, SS (subscriber unit) in the table 12 is equivalent to the MS (mobile station).

The MS performs ranging for adjusting uplink transmission parameters, before performing the entry process. The ranging comprises the initial ranging, periodic ranging, handover ranging and bandwidth request ranging, and different ranging code is used according to the case. And, in one embodiment of this invention, the above mentioned ranging code can further comprise MIH ranging code. The above mentioned MIH ranging code will be described more specifically.

In the OFDMA environment, if the MS transmits CDMA code, randomly selected, to the BS, the BS can not notice the transmitter of that code. So the BS transmits broadcast message comprising uplink information such as the code received from the mobile station, the ranging state, time and frequency adjust values, transmission power, through the RNG-RSP message. If a MS receives the RNG-RSP message comprising the code transmitted by that MS, the MS adjust the uplink parameters in the RNG-RSP message, transmits the MAC address of that MS, and register with the BS.

Figure 4:
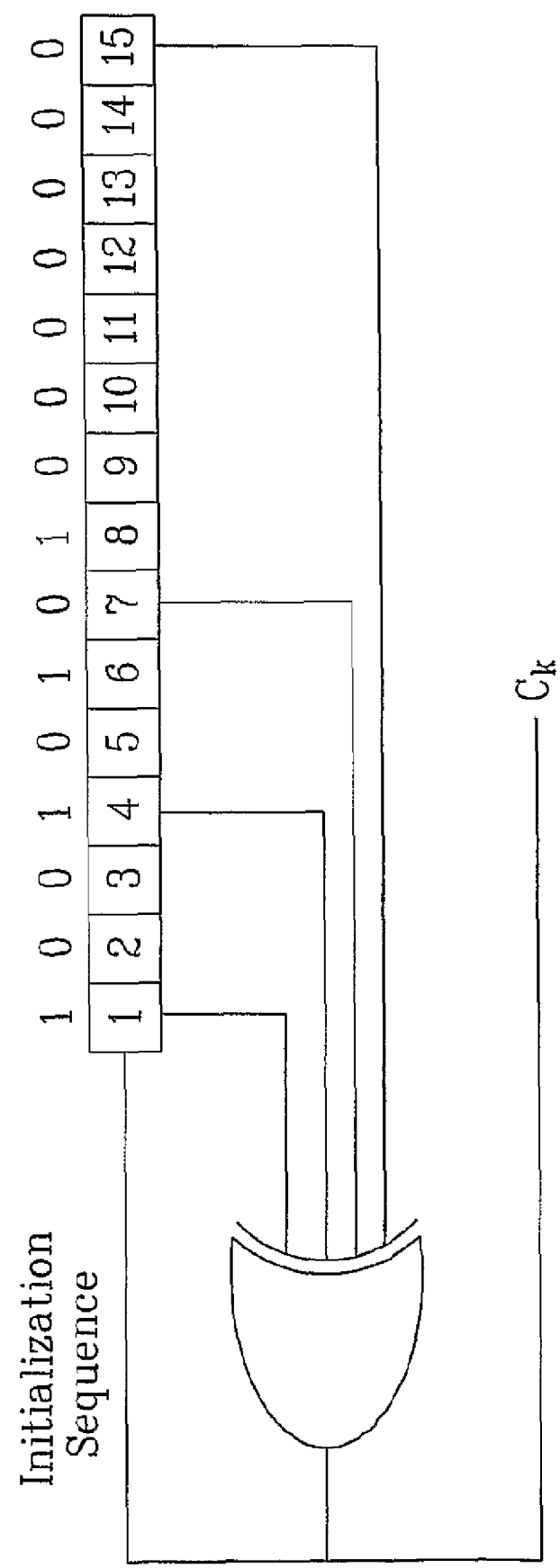
FIG. 4 shows an example of PRBS which generates ranging code.

FIG. 4 shows an example of PRBS which generates the ranging code.

The ranging code uses 256 codes from 0~255, and the BS divides that ranging codes into 4 subgroup according to the type of the ranging codes, as shown in the FIG. 4. But, in the above mentioned embodiment of this invention, if the MIH ranging code is included to the four type ranging codes, additional subgroup may be needed.

On the other hand, the PRBS which generates the ranging code comprises a polynomial generator which performs polynomial generation as $1+X^1+X^4+X^7+X^{15}$, and the seed values b0-b15 for this polynomial generation may be 0, 0, 1, 0, 1, 0, 1, 1, 1, s0, s1, s2, s3, s4, s5, s6. Here, s0-s6 is the UL_IDcell values which have different value for each BS, and the PRBS can generate $2^{16}$ codes. Thus, codes of 65536 bits can be generated, and each ranging code can have 144 bits. That is, the first ranging code has 0-144 bits, and the second ranging code has 145-288 bits, and so on.

Such bit level ranging code can be modulated and transmitted by each subcarrier consisted of 6 subchannel. The 256 ranging codes can be used as follows. For example S, having the meaning of initial offset, can be received by the UCD channel encoding, and the number of ranging codes according to each ranging type also can be received by the UCD channel encoding. The initial value, S, exists between 0-255, and N codes for the initial ranging can be generated as 144*(S mod 256)~144*((S+N) mod 256)-1 of the PRBS. And, M codes for the periodic ranging can be generated as 144*((N+S) mod 256)~144*((N+M+S) mod 256)-1 of the PRBS. And, L ranging codes for the bandwidth request can be generated as 144*((N+M+S) mod 256)~144*((N+M+S+L)) mod 256)-1 of the PRBS.

Table 13 shows the MIH ranging code added as UCD-PHY specific encoding according to the one embodiment of this invention, as described above.

As the type of the CDMA code group, in addition to the codes for the initial ranging, the codes for the periodic ranging, the codes for requesting bandwidth, and the coded for handover, MIH ranging code can be inserted in the UCD message, according to the embodiment of this invention. By doing so, the mobile station can transmit the MIH ranging code through the uplink region allocated for the ranging of the MS when the MS wants to initiate the MIH communication. Such MIH ranging codes added according to the embodiment of this invention can be a part of the 256 ranging codes, and can be generated by combining the conventional 4 type codes according to some rule.

TABLE 13

| Name | Type | Length | Value |
|---|---|---|---|
| MIH ranging code | XX | 1 | The number of MIH ranging CDMA codes. The available values are 0-255. |
| start position of the ranging code group | XX | 1 | All the ranging codes used in this uplink exist between S and ((S + O + N + M + L + K) mod 256). Where, N is the number of initial ranging codes, M is the number of periodic ranging codes, L is the number of bandwidth request ranging codes, O is the number of handover ranging |

TABLE 13-continued

| Name | Type | Length | Value |
|------|------|--------|-------|
|  |  |  | codes, and |
|  |  |  | K is the number of MIH ranging codes. |
|  |  |  | $0 \leq S \leq 255$. |

According to one embodiment of this invention, such MIH ranging code can be inserted in 2 or 4 OFDM symbols against the case of receiving codes that is damaged in part. If the MIH ranging code inserted in 4 OFDM symbols, different two type of MIH ranging codes can be inserted. By doing so, if the first code inserted is damaged, the second code can be used.

Next, table 14 shows an example of UL_MAP-IE among elements consisting UL-MAP. This can be used in CDMA bandwidth request and performing ranging when the UIUC is 12, in the OFDMA environment.

TABLE 14

| Syntax | Size | Notes |
|--------|------|-------|
| UL-MAP_IE ( ) { |  |  |
| CID |  |  |
| UIUC |  |  |
| If (UIUC) == 12 { |  |  |
| OFDMA Symbol offset |  |  |
| Subchannel offset |  |  |
| No. OFDMA Symbols |  |  |
| No. Subchannels |  |  |
| Ranging Method | 2 bits | 0b00 - Initial Ranging/Handover/ MIH Ranging over two symbols |
|  |  | 0b01 - Initial Ranging/Handover/ MIH Ranging over four symbols |
|  |  | 0b10 - BW Request/Periodic Ranging over one symbol |
|  |  | 0b11 - BW Request/Periodic Ranging over three symbols |
| ... | ... | ... |

As shown in the table 14, according to the method of performing ranging the amount of ranging codes can be different, so such ranging codes can be transmitted through several OFDM symbols.

And, table 15 shows the case that MIH_Polling_IE whose sub code is 0x0b is added in the UL_MAP_IE.

TABLE 15

| Extended UIUC | Usage |
|---------------|-------|
| 00 | Power_control_IE |
| 01 | Mini-subchannel_allocation_IE |
| 02 | AAS_UL_IE |
| 03 | CQICH_Alloc_IE |
| 04 | UL_Zone_IE |
| 05 | PHYMOD_UL_IE |
| 06 | MIMO_UL_Basic_IE |
| 07 | UL_PUSC_Burst_Allocation_in_Other_Segment_IE |
| 08 | Fast_Ranging_IE |
| 09 | UL_Allocation Start IE |
| 0B | MIH_Polling_IE |
| 0C . . . 0F | Reserved |

Table 16 shows MIH_Polling_IE format inserted in the UL_MAP such as the above table 15. And, the MIH_Polling_IE in table 16 is for polling to the mobile station, when the BS acquires the response MIH frame to the request from the information server. The mobile station received MIH_Polling_IE in the UL_MAP transmits MOB_MIH message comprising query ID to the BS, so the mobile station can receive a response to the request MIH frame.

TABLE 16

| Syntax | Size | Notes |
|--------|------|-------|
| MIH_Polling_IE ( ) { |  |  |
| Extended UIUC | 4 bits | MIH_Polling = 0x0B |
| Length | 4 bits |  |
| Query ID | 16 bits |  |
| Duration | 10 bits | OFDMA slots |
| Reserved | xx |  |
| } |  |  |

"Query ID" is an identifier for identifying MIH frame transmitted by the MS, and "Duration" indicates the allocated resource for the MS receiving the MIH_Polling_IE to transmit MOB-MIH_MSG to the BS.

And, MAC version encoding indicates the MAC version of IEEE 802.16, and when it is transmitted between MS and BS, the following process will be performed.

When the version of BS is higher than the version of SS, the BS will communicate with a MS indicated by the MS.

When the version of BS is higher than the version of SS, if conformance with version is not supported, the MS can not transmit through uplink.

Table 17 shows an example of such MAC version.

TABLE 17

| Type | Length | Value | Scope |
|------|--------|-------|-------|
| 148 | 1 | Version number of IEEE 802.16 supported on this channel. | PMP: |
|  |  | 1: Indicates conformance with IEEE Std 802.16-2001 | DCD, RNG-REQ |
|  |  | 2: Indicates conformance with IEEE Std 802.16c-2002 and its predecessors | MESH: REG-REQ, |
|  |  | 3: Indicates conformance with IEEE Std 802.16a-2003 and its predecessors | REG-RSP |
|  |  | 4: Indicates conformance with IEEE Std 802.16-2004 |  |
|  |  | 5: Indicates conformance with IEEE Std 802.16-2004 and IEEE Std 802.16e-2005 |  |
|  |  | 6: Indicates conformance with IEEE Std 802.16-2004, IEEE Std 802.16e-2005 and IEEE Std 802.16f-2005 |  |
|  |  | 7: Indicates conformance with IEEE Std 802.16-2004, IEEE Std 802.16e-2005, IEEE Std 802.16f-2005 and IEEE Std 802.16g-2007 |  |
|  |  | 8-255: Reserved |  |

Table 18 shows an MAC version added according to one embodiment of this invention.

TABLE 18

| Type | Length | Value | Scope |
|------|--------|-------|-------|
| 148 | 1 | 8: Indicates conformance with IEEE Std 802.16-2005 and IEEE Std 802.16g-2007<br>9-255: Reserved | RNG-REQ |

The MS transmits the ranging code corresponding to the usage for adjusting the uplink parameters. And, the MS receives the 'success' from the BS and finishes the adjusting uplink parameters. After that, the MS transmits a MAC address and a MAC version to the BS, and registers with the BS. For performing the process of acquiring MIH information, the MS transmits MIH MAC version in the RNG-REQ message for the BS to allocate for the same. In the table 18, IEEE Std 802.16g-2007 indicate the number of standard supporting the MIH defined by IEEE 802.21. And, the form of the standard number can be expressed differently.

MIH payload transmission message (or MOB_MIH-MSG) is described as follows.

The MOB_MIH-MSG is a MAC message for transmitting MIHF protocol message defined ny the objects of the broadband wireless access system in the IEEE 802.21, and it can be transmitted by basic CID, primary CID or multicast CID. In this case, HMAC/CMAC tuple for authenticating the message as TLV can be transmitted together with the MOB_MIH-MSG.

Table 19 shows an example of the MOB_MIH-MSG.

TABLE 19

| Syntax | Length | Description |
|--------|--------|-------------|
| MOB_MIH-MSG_Message_Format( )<br>{<br>Management Message Type = 67<br>TLV Encoded Information<br>} | <br><br>8 bits<br>Variable | <br><br><br>TLV specific |

On the other hand, the MOB_MIH-MSG according to one embodiment of this invention is a MAC management message for transmitting MIH frame from MS to BS, or from BS to mobile station. This message can be transmitted by a management CID such as basic CID and primary CID, or can be broadcasted by multicast CID.

Table 20 shows an example of such MOB_MIH-MSG format.

TABLE 20

| Syntax | Length | Description |
|--------|--------|-------------|
| MOB_MIH-MSG_Message_Format( ) {<br>Management Message Type = 67 | <br>8 bits | |
| Fragmentation and/or Packing Indicator | 4 bits | Indicator which indicates whether the MIH frame included by TLV for transmitting is packed, and whether the MIH frame included by TLV for transmitting is fragmented. |
| Sequence Number | 4 bits | Randomly allocated sequence number. When the fragmentation is used, the sequence num allocated randomly at first, and increased by 1 at receiving subsequent fragmented packet. For example, if the first fragmented packet has 0b0 (1 in decimal), the second fragmented packet has 0b0010 (2 in decimal). The sequence number is used for putting together tl fragmented packets. |
| TLV Encoded Information<br>} | Variable | TLV specific |

The parameters in the table 20 will be described as follows.

"Fragmentation and/or Packing Indicator" is an indicator which indicates whether the MIH frame included by TLV for transmitting is packed, and whether the MIH frame included by TLV for transmitting is fragmented. Plurality of MIH frame can be packed, and/or one MIH frame or packed plurality of MIH frame can be fragmented.

Here, the fourth bit indicates whether the packing is used, the third bit indicates whether MIH frame is fragmented in the middle, the second bit and the first bit indicate whether the fragmentation is used and the transmitted part is a first part of the fragmented frame, the middle part of the fragmented frame, or the final part of the fragmented frame.

For example, 0000 indicates that the packing is not used, 0001 indicates that the packing is not used, that the fragmentation is used, and that the transmitted part is the first part of the fragmented frame. And, 0010 indicates that the packing is not used, that the fragmentation is used, and that the transmitted part is the middle part of the fragmented frame, and 0011 indicates that the packing is not used, that the fragmentation is used, and that the transmitted part is the final part of the fragmented frame. And, 1000 indicates that two or more MIH frames are packed, and that the fragmentation is not used. And, 1001 indicates that two or more MIH frames are packed, that the fragmentation is used, and that the transmitted part is the first part of the fragmented frame. And, 1010 indicates that two or more MIH frames are packed, that the fragmentation is used, and that the transmitted part is the middle part of the fragmented frame. And, 1011 indicates that two or more MIH frames are packed, that the fragmentation is used, and that the transmitted part is the final part of the fragmented frame. Moreover, x0xx indicates that the MIH frame is fragmented in the final part and starts at next MIH frame. And, x1xx indicates that the MIH frame is fragmented in the middle part and should be transmitted to the upper layer (MIH) by assembling the fragmented part with the first part of the next frame Next, "Sequence Number" is a randomly allocated sequence number. When the fragmentation is used, the sequence number is allocated randomly at first, and increased by 1 at receiving subsequent fragmented packet. For example, if the first fragmented packet has 0b0001 (1 in decimal), the second fragmented packet has 0b0010 (2 in decimal). The sequence number is used for putting together the fragmented packets. As like the above, next to 0b1111 is 0b0000.

Table 21 shows another example of MOB_MIH-MSG format.

TABLE 21

| Syntax | Length | Description |
| --- | --- | --- |
| MOB_MIH-MSG_Message_Format( ) { | | |
| Management Message Type = 67 | 8 bits | |
| Fragmentation Index | 4 bits | Indicates present fragmentation index. |
| Total Fragmentation | 4 bits | Indicates the total number of Fragmentatior |
| TLV Encoded Information | Variable | TLV specific |
| } | | |

The parameters in the table 21 will be described as follows.

"Fragmentation Index" indicates the sequential index of the present fragment among total fragments. If the present fragment is the first fragment, the fragmentation index is set to 0.

And, "Total Fragmentation" indicates the total number of fragmentation, and if no fragmentation is used, the total fragmentation is set to 1111.

Table 22 shows another example of MOB_MIH-MSG format.

TABLE 22

| Syntax | Size | Notes |
| --- | --- | --- |
| MOB-MIH_MSG_Message_Format( ){ | | |
| Management Message Type = 67 | 8 bits | |
| TLV Encoding | Variable | |
| } | | |

And, if MOB_MIH-MSG is used at acquiring information from the information server, the following TLV is needed.

Table 23 shows MOB_MIH-MSG TLV added according to one embodiment of this invention. MAC layer of the BS inserts MIH frame comprising the acquired MIH information element as TLV, and transmits it to the MAC layer of the mobile station.

TABLE 23

| Type | Length | Value |
| --- | --- | --- |
| Multicast CID | 16 bits | One of the Multicast CIDs is allocated. |
| Cycle | 8 bits | Offset used in transmitting MIH frame. (in frame unit) |
| MIH Frame | N | MIH Frame (Plurality of frame can be followed according to the requested number or whether the packing is used or not) |

TABLE 23-continued

| Type | Length | Value |
| --- | --- | --- |
| MIH Frame | N | MIH Frame (Plurality of frame can be followed according to the requested number or whether the packing is used or not) |
| . . . | . . . | . . . |

If MOB_MIH-MSG is transmitted by MAC management CID, the MOB_MIH-MSG should have the MIH MIH_Frame_package and HMAC/CMAC tuple parameter encoded by TLV. The HMAC/CMAC tuple does not be included in the message transmitted and/or received for query while in the initial network entry. MIHF_Frame_package (see 11.20) should comprise the request MIH frame prior to the response MIH frame, when transmitting information response message in the MOB_MIH-MSG which stored in the BS in the initial network entry and transmitted by multicasting. And, HMAC/CMAC Tuple (see 11.1.2) does not included in the message for acquiring information before the initial network entry. On the other hand, HMAC/CMAC tuple should be a last one, if it is included in that message. In this case, the multicast CID and periodic parameters can be selectively included in that message.

The above mentioned multicast CID is the CID which transmits information response after acquiring information for the request of information before the initial network entry. This can be allocated between 0xFEA0-0xFEFE, and the CID allocated in that range for transmitting MOB_MIH-MSG can be used. And, the above mentioned 'cycle' is the offset value for the response to the query can be transmitted, and it will be discussed later, referring to FIG. 5.

The following tables 24 to 29 are TLVs which can be included in the MOB_MIH-MSG TLV region added according to one embodiment of this invention. The required TLVs can be inserted in the MOB_MIH-MSG TLV region according to the timing of transmission and any other requirements. The MIH frame for query to the information server and the MIH frame comprising the response can be included as TLV, and "Fragmentation/Packing Information TLV" of table 28 can be included when fragmentation/packing is used.

TABLE 24

| Type | Length | Value | Scope |
| --- | --- | --- | --- |
| Delivery Method and status code | 1 | Bit #0: Unicast<br>Bit#1: Multicast<br>Bit#2~6: Status code<br>Bit#7: Reserved | MOB_MIH-MSG |

In the table 24, example of 5 status code values among 8 possible states which can be represented by bit #2-4 among the bit #2-6 can be expressed as follows.

0x0000: Null
0x0001: MIH_Not_Supported
0x0002: Requested_Delivery_Method_Not_Supported
0x0003: Request_Info_Not_Available
0x0004: Response_Not_Received "Delivery Method and Status" indicates the delivery method of MIH frame comprising the information received from the information server, and which will be transmitted from the BS to the mobile station. And, "Delivery Method and Status" can be a unicast or multicast.

The mobile station can transmit its preference while transmitting the information query, so the mobile station can negotiate the delivery method. And, the BS can transmit the status code indicating the status of the requested information. If the MS transmits the query, the status code can be set as 0x0000.

TABLE 25

| Name | Type | Length | Value | Scope |
|---|---|---|---|---|
| Multicast CID | XXX | 2 | To be used to deliver query response | MOB_MIH-MSG |

The table 25 can be inserted in the MOB_MIH-MSG transmitted from the BS to mobile station as multicast CID TLV, when the delivery method is bit#1 (Multicast).

TABLE 26

| Name | Type | Length | Value | Scope |
|---|---|---|---|---|
| Query ID | XXX | 1 | To be used for request to retrieve the response in the unicast mechanism | MOB_MIH-MSG |

Table 26 can be inserted in the MOB_MIH-MSG as Query ID TLV. More specifically, table 26 can be included as query identifier for requesting query response, when the delivery method is bit#0 (unicast) in the MOB_MIH-MSG transmitted to the mobile station after the mobile station transmits the query MIH frame.

TABLE 27

| Name | Type | Length | Value | Scope |
|---|---|---|---|---|
| Cycle | XXX | 1 | Offset in MIH Frame to be delivered | MOB_MIH-MSG |

Table 27 shows the cycle TLV, and can be included in the MOB_MIH-MSG transmitted from the BS to the mobile station. This is for reducing power consumption of the MS, because by this the MS only needs to look at the time the cycle indicates.

TABLE 28

| Name | Type | Length | Value | Scope |
|---|---|---|---|---|
| Fragmentation/Packing Information | XXX | 1 | Bit #0~3: Indicator which indicates whether the MIH frame to be transmitted is packed and whether the MIH frame to be transmitted is fragmented Bit #4~7: Randomly selected sequence number. Randomly allocated sequence number. When the fragmentation is used, the sequence number is allocated randomly at first, and increased by 1 at receiving subsequent fragmented packet. For example, if the first fragmented packet has 0b0001 (1 in decimal), the second fragmented packet has 0b0010 (2 in decimal). The sequence number is used for putting together the fragmented packets. | MOB_MIH-MSG |

Table 28 is the Fragmentation/Packing TLV, and it can be included in the MOB_MIH-MSG comprising the response MIH frame transmitted from the BS to the mobile station, when the delivery method is multicast. This indicated whether the MIH frame which includes that TLV is fragmented because that frame is lager than the transmission MAC PDU, or whether the MIH frame which includes that TLV is packed.

TABLE 29

| Name | Type | Length | Value | Scope |
|---|---|---|---|---|
| Query Retry Counter | XXX | 1 | Offset in MIH Frame to be delivered | MOB_MIH-MSG |

Table 29 shows Query Retry Counter TLV, and this can be included in the MOB_MIH-MSG transmitted from the BS to the mobile station. The mobile station receiving this TLV think that the information is not available in the BS, when the query retry counter of the MOB_MIH-MSG transmitted by multicasting is greater than the predetermined cycle. Here, the cycle is received by the mobile station from the BS, and it indicates a possible cycle to transmit query response. The detailed description about the cycle will be followed, referring to FIG. 5.

Figure 5:
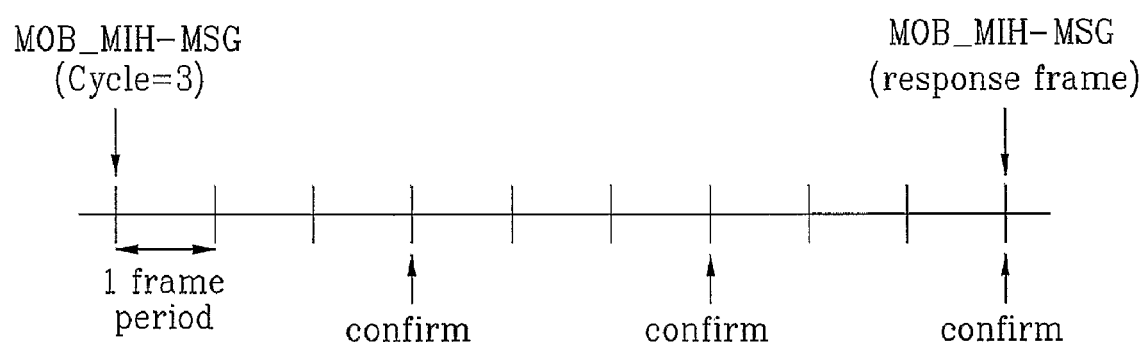
FIG. 5 shows the transmission cycle of the MAC management message for transmitting MIH frame from MS to BS.

FIG. 5 shows the transmission cycle of the MAC management message for transmitting MIH frame from MS to BS.

The MS acquires the cycle value for possible cycle to receive the response message to the information query. At first cycle, the MS confirms whether the MOB_MIH-MSG comprising the response message is received. If no response message is found at that cycle, the mobile station waits until the next cycle. And, the MS confirms whether the MOB_MIH-MSG is received at the next cycle. As like above, the MS confirm whether the MOB_MIH-MSG is received until the response is found.

MS can save its power by putting off or reducing its power at the frame which is not the cycle indicated by the BS. After the MS found the response message, the MS need not confirm whether the MOB_MIH-MSG is received.

If the MOB_MIH-MSG is transmitted by multicast CID, MIH frame comprising TLV encoded parameters is included in the MOB_MIH-MSG. Plurality of MIH frames can be included such as information request MIH frame, response MIH frame to the same, and so on.

The response MIH frame to the information request (or query) can be delivered by MIH frame. In the MIH frame, the information request MIH frame received from the MS is included first and the response MIH frame to the same is included following that. This is for the MS, not intended to receive, to know what information is requested and what information in acquired.

C-MIH-NOTIFY primitive is for the object of the broadband wireless access system to transmit MIH frame in the MOB_MIH-MSG to NCMS through C-SAP.

And, the following parameters is used for performing MIH ranging, and transmitted between MIH and MAC of the MS.

First, C-NEM-REQ (Action Type=Ranging) is explained. This primitives if performing function for requesting ranging. The upper layer management entity requests ranging by delivering this primitive to MAC layer through NCMS.

Table 30 shows the structure of this primitive.

TABLE 30

| Name | Type | Valid Range | Description |
|---|---|---|---|
| Ranging Type | Enumeration | Initial Handoff Location Update Periodic MIH | This identifies the ranging type |
| MIH Frame Length | MIH Frame Length | Any valid length | Size of MIH Frame received from MIH |

This primitive shown in the table 30 is generated by upper layer management entity comprising MIHF for initiating ranging process for initial network entry, reentry after handover, periodic ranging, reentry to the network in idle-mode, updating the location of idle-mode MS, and MIH ranging of MS with MIHF. By this, MAC layer generates RNG-REQ MAC management message comprising TLV corresponding the ranging type.

Next, C-NEM-RSP (Action Type=Ranging) will be explained. This primitive performs a function of notifying the upper layer comprising MIHF the result of the ranging, and the structure of this primitive is shown in table 31.

TABLE 31

| Name | Type | Valid Range | Description |
|---|---|---|---|
| Result Code | Enumeration | | Result of ranging request Success Continue Fail |

This primitive is generated when the MAC layer receives RNG-RSP message, or when BS allocates uplink bandwidth for MIH frame after RNG-RSP. By this primitive, the upper layer entity comprising MIHF receives the result of the ranging, the MIHF can transmit MIH frame to MAC using C-MIH-NOTIFY.

And, C-NEM-REQ (Action type=Capability negotiation) primitive and C-NEM-RSP (Action type=Capability negotiation) primitive which is the response to the C-NEM-REQ are the primitives for transmitting the information transmitted or received by SBC-REQ/RSP message to upper layer.

And, C-NEM-REQ (Action Type=Authentication) primitive and C-NEM-RSP (Action Type=Authentication) primitive which is the response to the C-NEM-REQ is for authentication process, and these primitives transmits the information received or transmitted by PKM-REQ/RSP message to upper layer.

And, C-MIH-IND primitive is a mean for transmitting MIH frame between upper layer (ex, NCMS) and MAC object of MS or BS, and can comprise MIH frame and function frame type. The MAC layer receiving this primitive can transmit MIH frame to corresponding MAC layer through MOB_MIH-MSG or PKM-REQ/RSP message.

And, "MIH function frame" and "MIH function frame type" can be expressed as table 32nd table 33.

TABLE 32

| Type | Length | Value | Scope |
|---|---|---|---|
| ?? | Variable | MIH frame described at subclause 8.2.1 of IEEE 802.21 in the transmission option 2 of table 17, subclause 8.2 | MOB_MIH-MSG PKM-RSP PKM-RSP |

TABLE 33

| Type | Length | Value | Scope |
|---|---|---|---|
| ?? | 1 | 0: discover ES/CS MIH capability 1: Event service 2: Command service 3: Information Service 4-255: Reserved | MOB_MIH-MSG PKM-RSP PKM-RSP |

And, table 34 describes the rest parameters and constancies.

TABLE 34

| System | Name | Time Reference | Minimum Value | Default Value | Maximum Value |
|---|---|---|---|---|---|
| BS | T9 | Registration Timeout, the time allowed between the BS sending a RNG-RSP (success) to an SS, and receiving a SBC-REQ or MOB_MIH-MSG from the same SS | 300 ms | 300 ms | |
| BS | T47 | CID Timeout, the time allowed between receiving a MOB_MIH-MSG from an SS, and receiving a SBC-REQ from the same SS. If the BS does not receive a SBC-REQ within the time, management CIDs will be released | | | |
| BS | T48 | The time allowed between transmitting SBC-RSP by BS and Receiving PKM-REQ | | | |
| BS | T49 | The time allowed between receiving PKM-RFQ (code = PKMv2 EAP Start) and receiving PKM-REQ (code = PKMv2 EAP Start) or PKM (code = PKMv2 RSA-request). If Time out or Polling Retry count is exhausted, the management CID is released. | | | |
| SS | Query | MS: If MOB-MIH-MSG to be transmitted | = | 5 | 50 |

TABLE 34-continued

| System | Name | Time Reference | Minimum Value | Default Value | Maximum Value |
|---|---|---|---|---|---|
| | Retry Counter | by multicast exceeds the cycle defined by this parameter, SS decides that this information is not valid at BS. Here, the cycle is transmitted by the BS, that indicates possible cycle. BS: BS performs polling specific SS through MIH_Polling_IE for transmitting by unicast. If there is no response until the number of the polling exceeds the number defined by this parameter, BS decides the SS to receiving the query is not valid. | | | |
| Polling Retry count | | BS: The BS performs polling specific SS through MIH_Polling_IE for transmitting by unicast. And, if the SS does not response to the polling by the time defined by this parameter, the BS decides that the SS is not valid. | | | |

And, table 35 shows another example of Query Retry Counter parameter in the table 34.

TABLE 35

| System | Name | Time Reference | Minimum value | Default Value | Maximum Value |
|---|---|---|---|---|---|
| SS, BS | Query Retry Counter | MS: MS shall monitor the frame at the every cycle time for transmission of SII-ADV or PKM-RSP(Code = 34) to the Query Retry Counter value. BS: In case of unicast method, BS shall allocate UL bandwidth every the expiration of the duration indicated in the Cycle TLV in order for the MS to transmit Bandwidth request header up to the Query Retry Counter value. If the BS does not receive a bandwidth request header until the counter is exhausted, management CIDs shall be released. | | | |

Bandwidth request header transmitted by MS is used for indicating 'keep alive' of the MS. If the BS receiving bandwidth request header acquires the response to the query at every time after cycle expiration, the BS can transmit the response to the query through unsolicited PKM-RSP (code=34) without receiving PKM-REQ (code=33) to the BS.

And, table 36 shows and example of MIH message type which can be transmitted through PKM message.

TABLE 36

| Code | PKM message type | MAC management message name |
|---|---|---|
| ... | ... | ... |
| 31 | MIH Initial Request | PKM-REQ |
| 32 | MIH Initial Response | PKM-RSP |
| 33 | MIH Comeback Request | PKM-REQ |
| 34 | MIH Comeback Response | PKM-RSP |
| 35-255 | Reserved | |

The MIH initial response, shown in the table 36, can be called as 'MIH acknowledge'. And, the MIH comeback request can be omitted in the table 36, thus its function can be performed by only transmitting bandwidth request to the BS.

And, table 37 shows an example of parameters included in the MIHF frame when the PKM message code is the MIH initial request.

TABLE 37

| Attribute | Contents |
|---|---|
| MIHF frame type | Indicates type of MIHF frame (11, 1, 9, 1) |
| Delivery Method and Status Code | Indicates the delivery method of query response (11.1.9.4) |
| MIHF frame | MIHF frame TLV received through C-MIH-IND (11.20.1) |

And, table 38 shows an example of parameters included in the MIHF frame when the PKM message code is the MIH initial response or MIH acknowledge.

TABLE 38

| Attribute | Contents |
|---|---|
| MIHF frame type | Indicates the type of MIHF frame. Included only when the MIHF frame if present. (11.20.2) |

TABLE 38-continued

| Attribute | Contents |
| --- | --- |
| Cycle | Indicates the delivery method of query response (11.20.2) |
| Query ID | Used in mapping the query and the query response (11.20.5) |
| Delivery Method and Status Code | Indicates the delivery method and status code (11.20.4) |
| MIHF frame | MIHF frame TLV received through C-MIH-IND (11.20.1) |

In one embodiment of this invention, the MIHF frame type and MIH frame in the table 38 can be omitted, and the MIH frame type and MIH frame which comprises the response to the query can be transmitted in the later MIH comeback response message (shown in the table 40).

And, table 39 shows an example of parameters included in the MIHF frame when the PKM message code is MIH comeback request.

TABLE 39

| Attribute | Contents |
| --- | --- |
| Query ID | Used in mapping the query and the query response (11.20.5) |

And, table 40 shows an example of parameters included in the MIHF frame when the PKM message code is MIH comeback response.

TABLE 40

| Attribute | Contents |
| --- | --- |
| MIHF frame type | Indicates the type of MIHF frame. Included only when the MIHF frame is present. (11.20.2) |
| Query ID | Used in mapping the query and the query response (11.20.5) |
| MIHF frame | MIHF frame TLV received through C-MIH-IND (11.20.1) |

And, table 41 shows an example of C-MIH-IND primitive for transmitting PKM-MSG or MOB-MIH-MSG from 802.16 object to NCMS, or from NCMS to 802.16 object.

TABLE 41

C-MIH-IND Primitive
C-MIH-IND
(
Event_Type : MIH-IND
Destination : NCMS, BS, MS
Attribute_List :
MIHF frame, MS's status
)

Here, the MIHF frame is the MIH frame described in IEEE 802.21 standard. And, MS's status indicates the MS's authentication status for indicating whether the MS is authenticated or not (that is, 00: the MS is authenticates, 01: the MS is not authenticated, 10: the status is not identified). This value is generated for BS to indicate MIH about the MS's authentication status. When MIH receives this primitive, the MIH generated MIH frame to be transmitted to information server with authentication status bit according to this received primitive.

That is, BS transmits primitive with MS's authentication status to MIH object. The MIH object receiving this primitive generates MIH frame to be transmitted to the information server with authentication status information which is same to the authentication status in the received primitive, and transmits it to the information server. This MIH frame is for relaying the MIHF frame included in this primitive. The MIH object receiving this primitive from the BS can construct new MIHF frame, or can use the same MIHF frame with setting the MS's authentication status according to the status in this primitive.

A method for acquiring information from heterogeneous networks using the above mentioned control signals according to the preferred embodiment of this invention will be explained as follows.

Figure 6:
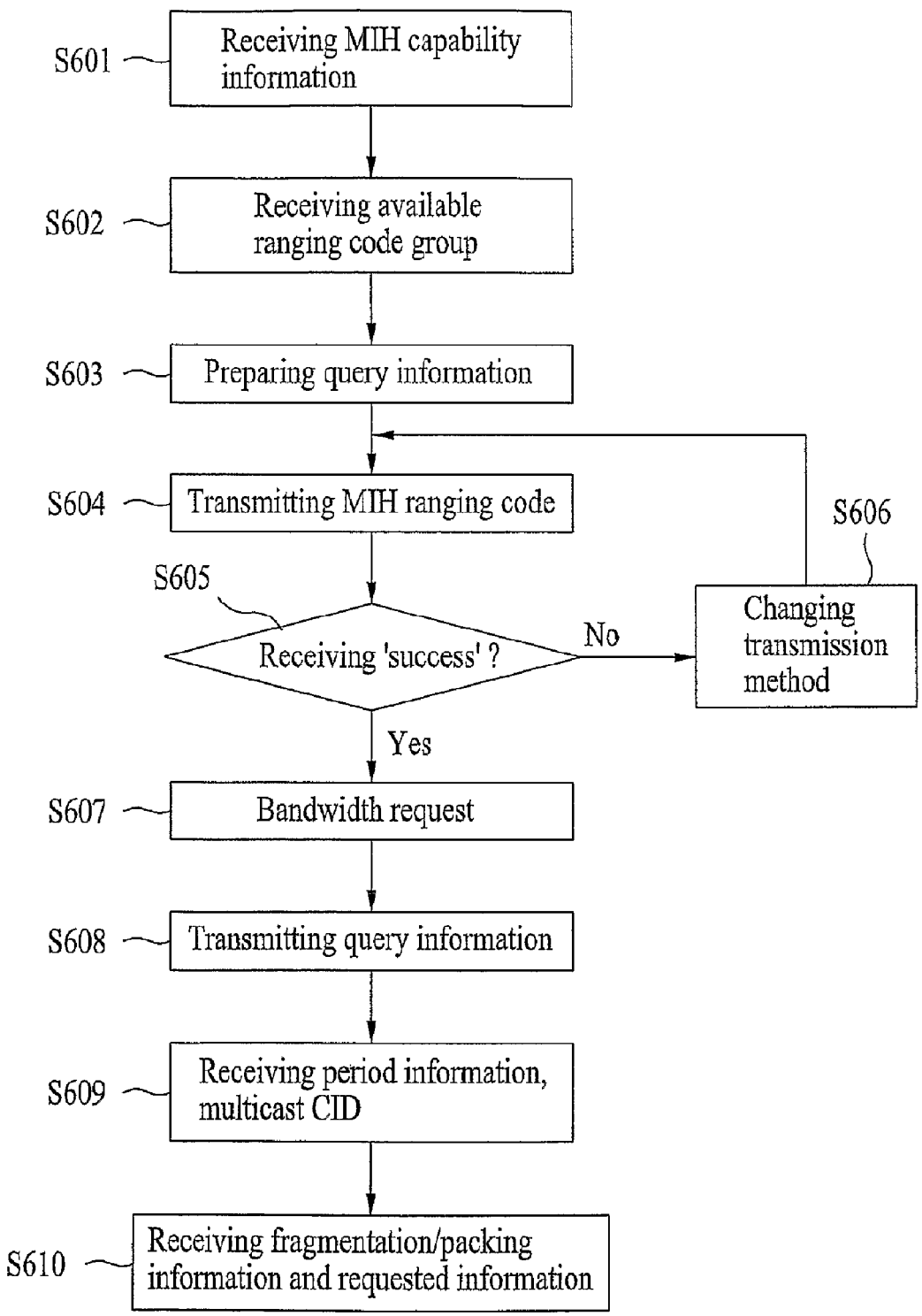
FIG. 6 is a flowchart showing a method for acquiring information about the handover between heterogeneous networks by MS, while performing ranging operation initiated by the MIH ranging code.

FIG. 6 is a flowchart showing a method for acquiring information about the handover between heterogeneous networks by MS, while performing ranging operation initiated by the MIH ranging code.

As shown in the FIG. 6, the method for acquiring information about handover between heterogeneous networks can be generalized as searching MIH capability (S601-S603), requesting information to the information server while performing ranging operation with BS (S604-S608), and receiving the information about the heterogeneous networks through above steps (S609-S610).

More specifically, at step S601 for searching MIH capability of BS, the MS receives MIH capability information from the BS. The conventional initial ranging operation received information only indicating whether the BS can perform MIH function, but the received information in the step S601 of this embodiment comprises not only whether the BS can perform MIH function, also which MIH service the BS can provide, such as information service, event service and command service.

And, at step S602, the MS receives information indicating the usage of each of 256 ranging codes. According to one embodiment of this invention, the type of ranging code not only can be a conventional ranging code type such as initial ranging code, periodic ranging code, bandwidth request ranging code and handover ranging code, also can be a MIH ranging code received by UCD message. The MIH ranging code can be used in operation for receiving information about heterogeneous networks before finishing network entry process. Then, at the step S603, the MS prepares query information to the information server according to the information acquired by the above MIH searching.

Next, at step S604, the MS transmits a code randomly selected from the codes which can be used in MIH ranging among the received MIH ranging code group. If the MS transmits the code through 4 OFDMA symbols, the MS can transmit the first selected ranging code through two symbols and transmit the next ranging code to the first selected ranging code through the rest two symbols. By this transmission of MIH code, the BS can think the MS can perform MIHF communication.

On the other hand, if the BS finishes preparing for performing MIH, the BS can transmit 'success' signal to the MS. And, on some cases, the BS can transmit 'continue' signal or 'fail' signal to the MS. At step S605, if the MS receives the 'success' signal, the method goes into step S607. On the other hand, at step S605, if MS receives 'continue' signal or others similar to the 'continue' signal, the method can go into step S606 and the MS can change the ranging code and transmit the changed code. But, the step S606 is optional one.

Then, at step S607, the MS can request bandwidth for transmitting query to the information server. Because the size of the query to the information server can be different according to the size of the MIH frame for query, this embodiment further comprises the step of bandwidth request and the step of bandwidth allocation, thus frequency efficiency can be achieved. In response to this request for bandwidth, the BS can allocate corresponding bandwidth to the MS, and at step S608, the MS can transmit the query to the information server to the BS.

The BS receiving this query to the information server transmit information, such as cycle for transmitting and multicast CID, for transmitting received information from the information server. At step S609, the MS receives this information from the BS, and the MS can look only at information indicated by the cycle, reduce the receiving power at other cycle, thus can save the battery. Then, at step S610, the MS can receive the fragmentation/packing information for putting together or separating the fragmented/packed information, thus can acquire the information about handover between heterogeneous networks easily.

Figure 7:
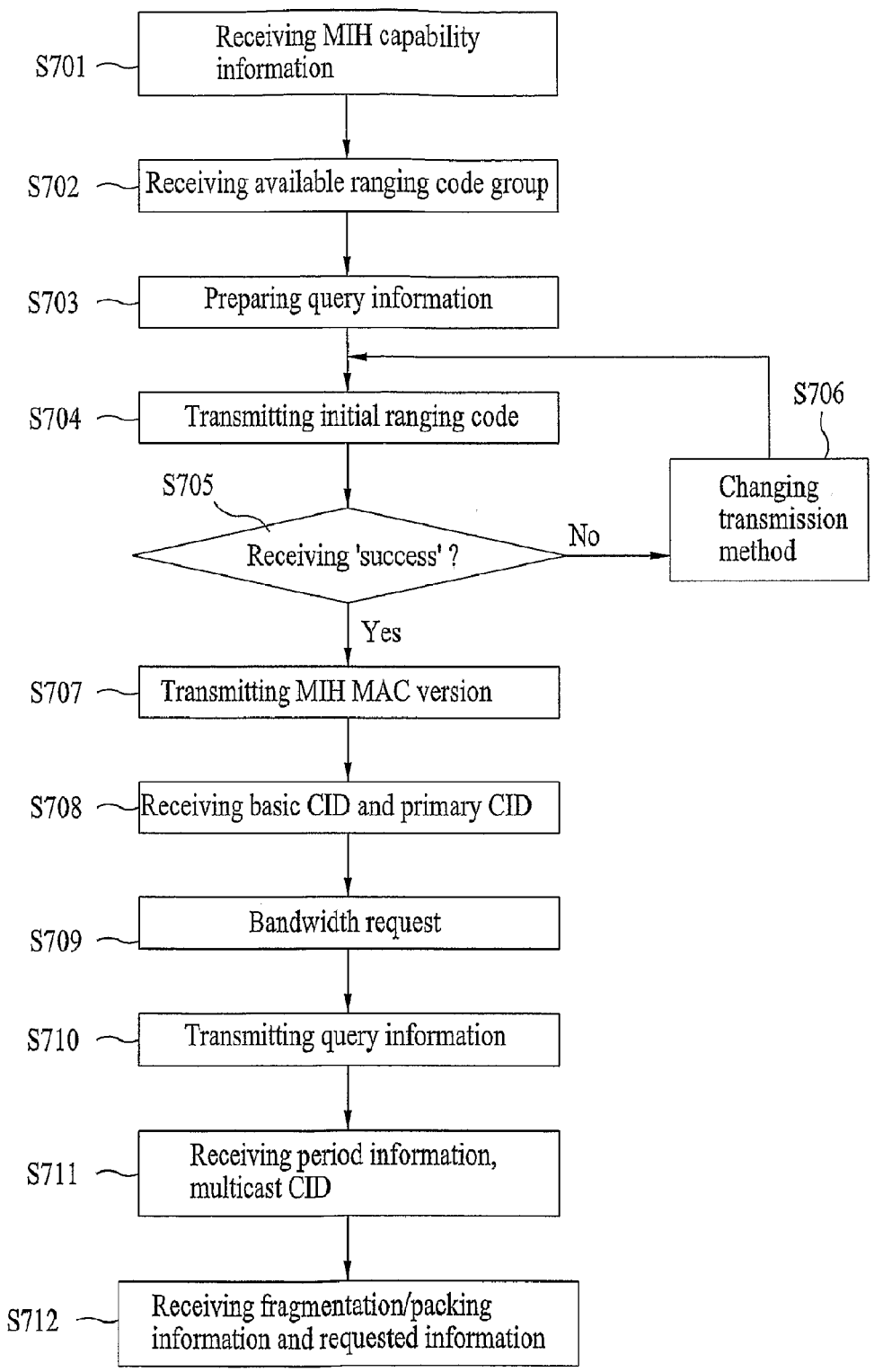
FIG. 7 is a flowchart showing a method for acquiring information about handover between heterogeneous networks from information server, while performing ranging operation by MS with BS of broadband wireless access system, using MIH MAC version.

FIG. 7 is a flowchart showing a method for acquiring information about handover between heterogeneous networks from information server, while performing ranging operation by MS with BS of broadband wireless access system, using MIH MAC version.

FIG. 7 is same to the FIG. 6 except transmitting initial ranging code (S704), transmitting MIH MAC version (S707) and receiving basic CID and primary CID, so the following description is focused to the different steps, for convenience.

After finishing steps S701-S703 of searching MIH capability, the MS transmit the initial ranging code to the BS, at step S704. By transmitting the initial ranging code in the step S704, the MS only adjusts the uplink parameters, and it does not mean that the MS indicate the BS that the MS is going to perform MIH as in the FIG. 6.

Then, at step S705, the MS determine whether it receives the 'success' signal from the BS, and if it receives the 'success' signal from the BS, it transmits MIH MAC version according to this embodiment, at step S707. The BS receiving this MIH MAC version thinks that the MS is capable of initiating the MIH communication, and allocates and transmits basic CID and primary CID. At step S708, the MS receives these CIDs. The state of receiving these CIDs is before entry into the network, so at this state, the MS can support information service and MIH capability detecting service, and so on, excepting event service and information service. The, at steps S709 to S712, the MS acquires the information acquired by the BS from the information server.

More detailed embodiment of this invention will be explained with the above mentioned generalized embodiment.

Figure 8:
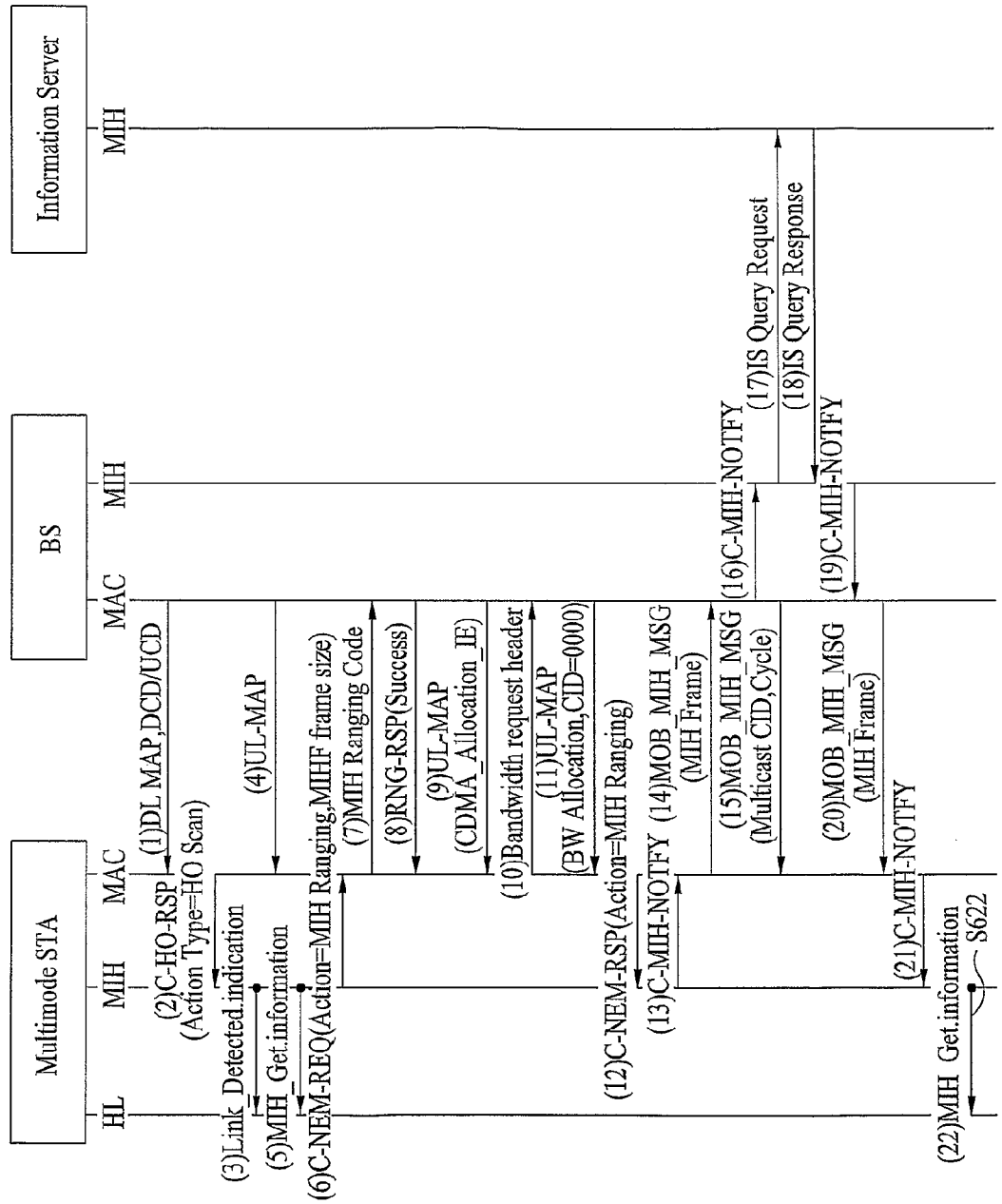
FIG. 8 is an exemplary figure showing a detailed method of the above mentioned FIG. 6, for acquiring information about handover between heterogeneous networks, while performing ranging process initiated by MIH ranging code, by MS with BS of broadband wireless access network.

FIG. 8 is an exemplary figure showing a detailed method for acquiring information about handover between heterogeneous networks, while performing ranging process initiated by MIH ranging code, by MS with BS of broadband wireless access network, of the above mentioned FIG. 6.

The MS searches the downlink channel, acquires the synchronizations of uplink and downlink, and acquires DL-MAP, DCD, and UCD. Here, according to one embodiment of this invention, DCD message comprises information for detecting MIHF capability of the BS (step (1)). The information for detecting MIHF capability of the BS is transmitted through C-HO-RSP primitive (step (2)), and further transmitted to the upper layer through Link_Detected.indication (step (3)).

Then, the BS transmits the UL-MAP to the MS to indicate uplink structure and to allocate bandwidth. Thus, the MS acquires the initial random access region through DL-MAP/UL-MAP, and acquires parameters needed for ranging through DCD/UCD, and this process can be performed independent from the steps (2), (3) and (5).

The upper layer of the MS transmits a primitive comprising information element to request, the MIH of the MS constructs MIH frame comprising this information element. The primitive shown in the FIG. 8 is the primitive for requesting information element of the neighboring network to the broadband wireless access network, but it can be transmitted as MIH_Capability_Discover primitive for requesting only MIHF entity capability information of the neighboring network (step (5)). The MIH receiving MIH_Get.information primitive make the MAC layer to initiate MIH ranging through C-NEM-REQ primitive, and indicates the size of the MIH frame, thus it make the MAC of the MS can know the amount of resource will be requested to the BS (step (6)).

The operation defined by the C-NEM-REQ used in step (6) is limited in prior art to 4 type ranging of initial ranging, periodic ranging, bandwidth request ranging, handover ranging, but according to one embodiment of this invention, the MIH ranging operation can be added to the above 4 type operation.

The MS randomly selects a MIH ranging code among the ranging type classified by the UCD message, and transmits it to the BS (step (7)). The BS thinks that the MS want to initiate the MIH communication, and transmits 'success' signal to the MS through RNG-RSP (step (8)). Here, the MIH communication means the MIH capability detection service and information service, excepting event service and command service, because the MS is not yet enter into the network.

Then, the BS transmits CDMA allocation IE for the MS to request bandwidth (step (9)). And, the MS transmits bandwidth request header using CID 0000 to the BS (step (10)). Then, the BS allocates uplink bandwidth for the MS to transmit MIH service request, and transmits UL-MAP comprising the allocated bandwidth information (step (11)).

After that, MAC of the MS indicated the MIH through C-NEM-RSP that it finished the MIH ranging process and it is prepared for transmitting MIH frame (step (12)). The MIH transmits the MIH frame comprising the information element received through C-MIH-NOTIFY (in the step (5)) to the MAC (step (13)). Then, the MAC of the MS transmits MIH frame to the MAC of the BS (step (14)), and the BS transmits multicast CID and cycle to the MS (step (15)). The multicast CID is for transmitting MIH frame, and the cycle is for saving power of the MS by indicating the timing of transmitting MIH frame.

FIG. 8 shows an example of using multicast CID for transmitting MIH frame, but according to another embodiment of this invention, unicast CID can be used for transmitting MIH frame only to the MS transmitting the query. But, when receiving the same queries from two or more MSs, to avoid repeating transmission of the same MIH frames, using the multicast CID can be preferred in some case.

And, MAC of the BS transmits the MIH frame to the MIH of the BS, and receives MIH frame comprising information element acquired by requiring to the information server (steps (16)-(19)). If requiring and responding about the capability of the MIHF, at steps (14), (16) and (17), the MIH_Capability_Discovery.request frame is transmitted to MIH object, not to the information server, and the response in the steps (18), (19), (20) and (21) comprises MIH_Capability_Discover.response frame.

In this embodiment, the MIH of the BS relays request and/or response message between information server (or MIH object) and MS. But, in another embodiment of this invention, the MAC of the BS can transmit the information request message by predetermined method, such as tunneling for connecting the MAC of the BS to the information server or MIH object. And, if there is no MIH in the BS and if the MAC of the BS should transmit this MIH frame, the MAC of the BS should understand the TLV included in MOB-MIH-MSG, and transmit to the corresponding object.

Back to the FIG. 8, the MAC of the BS transmits MOB_MIH_MSG comprising MIH frame to the MAC of the MS at the timing indicated by the cycle (step (20)). And, the MAC of the MS transmits MIH frame to the MIH of the MS through C-MIH-NOTIFY (step (21)), and the MIH of the MS transmits the MIH frame to the upper layer through MIH_Get.information (step (22)).

Figure 9:
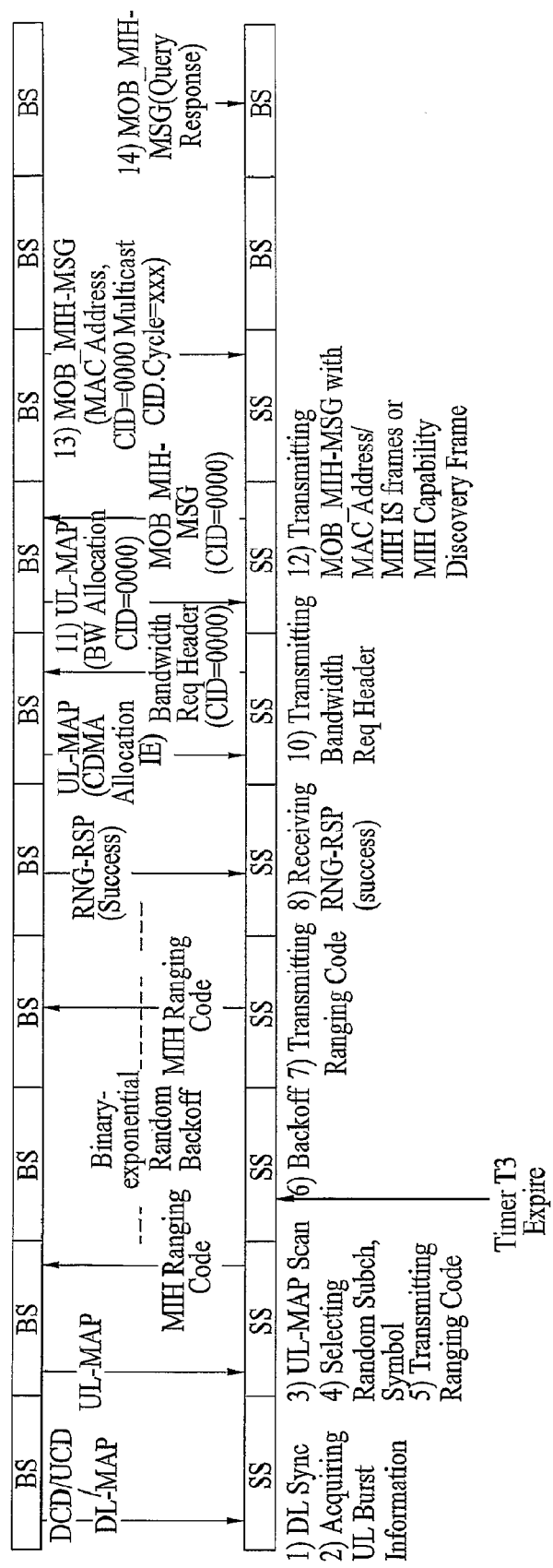
FIG. 9 is an example of detailed procedure of the FIG. 8 for MAC procedure according to frame synchronization between MS and BS.

FIG. 9 is an example of detailed procedure of the FIG. 8 for MAC procedure according to frame synchronization between MS and BS.

The steps shown in the FIG. 9 are similar to the steps of FIG. 8, so detailed description of the FIG. 9 will be apparent to those skilled in the art.

FIGS. 10-13 show detailed exemplary procedure of the method according to the FIG. 7.

Figure 10:
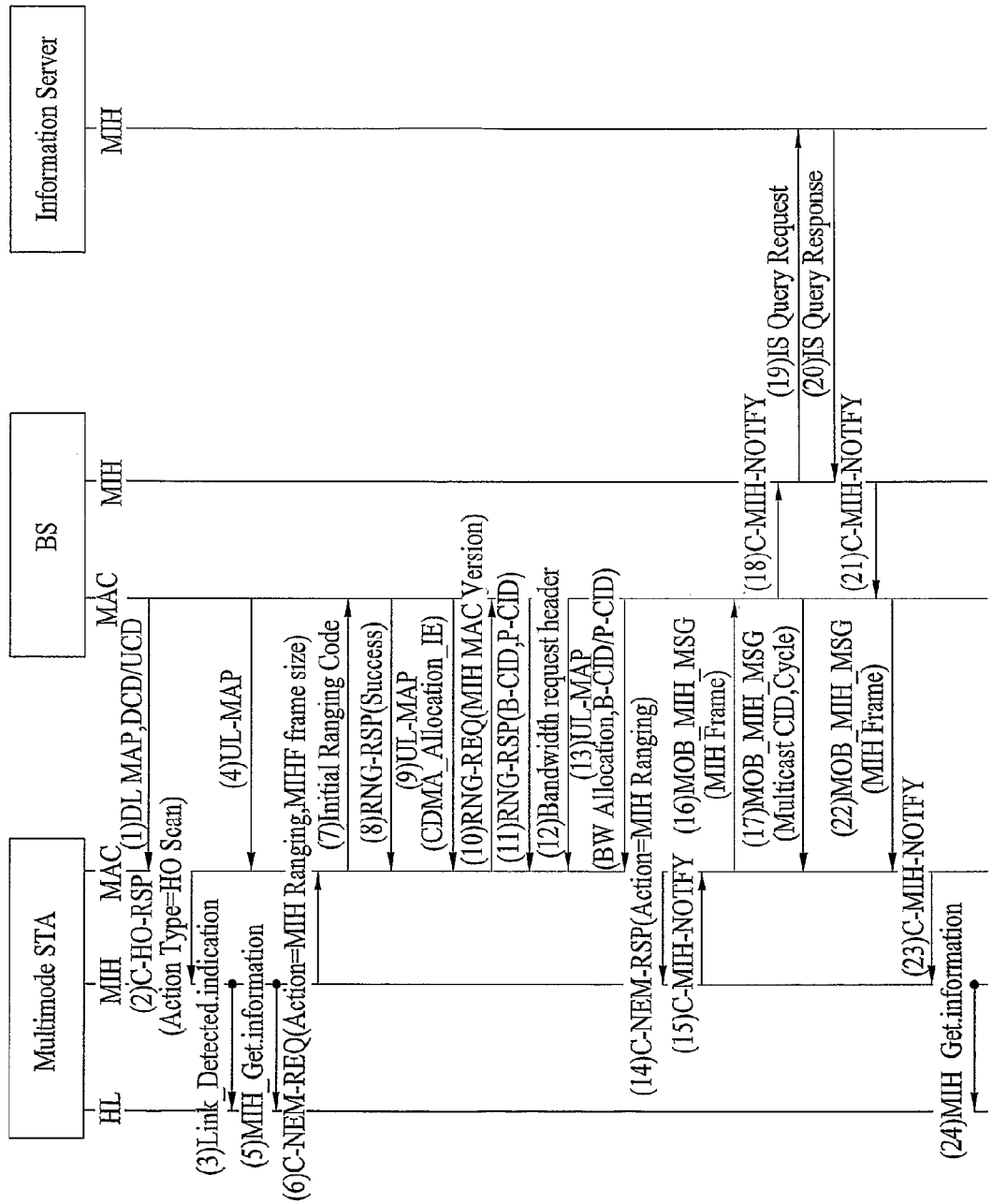
FIG. 10 shows an detailed exemplary procedure of the FIG. 7 for acquiring information about handover between heterogeneous networks from information server, while the multi-mode MS performing ranging procedure with BS of broadband wireless access system using MIH MAC version.

First, FIG. 10 shows an detailed exemplary procedure of the FIG. 7 for acquiring information about handover between heterogeneous networks from information server, while the multimode MS performing ranging procedure with BS of broadband wireless access system using MIH MAC version.

The MS search downlink channel, acquires uplink and downlink synchronization from the BS, and acquires DL-MAP, DCD and UCD (step (1)). The UCD message comprises information for detecting MIHF capability of the BS. The MIHF capability detection information of the BS is transmitted to the MIH through C-HO-RSP primitive (step (2)), and is transmitted to the upper layer through Link_Detection.indication (step (3)).

The BS transmits UL-MAP, and indicates uplink structure and allocates bandwidth. The MS can acquires initial random access region through DL-MAP/UL-MAP, and acquires necessary parameters for ranging through DCD/UCD (step (4)), and this procedure can be performed independently from the steps (2), (3) and (5).

The upper layer of the MS transmits a primitive comprising information element for requesting to MIH, and the MIH construct MIH frame comprising the received information element. The primitive shown in the FIG. 10 is a primitive for requesting information element of neighboring network to broadband wireless access BS, nut it can be transmitted as MIH_Capability_Discover primitive for requesting only MIHF entity capability information of neighboring network (step (5)).

The MIH receiving MIH_Get.information primitive make the MAC layer to initiate MIH ranging through C-NEM-REQ primitive, and indicates the size of the MIH frame, thus it make the MAC of the MS can know the amount of resource will be requested to the BS (step (6)).

The MS randomly selects a MIH ranging code among the ranging type classified by the UCD message, and transmits it to the BS (step (7)). The MS adjusts uplink transmission parameters and timing values until it receives 'success' signal from the BS (step (8)).

Then, the BS transmits UL-MAP for allocating uplink bandwidth through CDMA allocation IE for the MS to transmit MAC address and MAC version (step (9)). And, the MS transmits the MAC address and MIH MAC version to the BS through RNG-REQ message (step (10)). The BS receiving the MIH MAC version think that the MS is capable of initiating the MIH communication, and allocates basic CID and primary CID through RNG-RSP message (step (11)). Here, the MIH communication means a service such as information service and MIH capability discover service, because the MS is not entered into the network.

The MS transmit bandwidth request using allocated basic CID or primary CID, and this is for requesting resource for transmitting MIH frame (step (12)). The BS requested to allocate bandwidth indicates the allocated resource through UL-MAP (step (13)).

After that, MAC of the MS indicated the MIH through C-NEM-RSP that it finished the MIH ranging process and it is prepared for transmitting MIH frame (step (14)). The MIH transmits the MIH frame comprising the information element received through C-MIH-NOTIFY (in the step (5)) to the MAC (step (15)).

Then, the MAC of the MS transmits MIH frame to the MAC of the BS using basic CID or primary CID (step (16)), and the BS transmits multicast CID and cycle to the MS (step (17)). The multicast CID is for transmitting MIH frame, and the cycle is for saving power of the MS by indicating the timing of transmitting MIH frame.

And, MAC of the BS transmits the MIH frame to the MIH of the BS, and receives MIH frame comprising information element acquired by requiring to the information server (steps (18)-(21)).

If requiring and responding about the capability of the MIHF, at steps (16), (18) and (19), the MIH_Capability_Discovery.request frame is transmitted to MIH object, not to the information server, and the response in the steps (20), (21), (22) and (23) comprise MIH_Capability_Discover.response frame.

In this embodiment, the MIH of the BS relays request and/or response message between information server (or MIH object) and MS. But, in another embodiment of this invention, the MAC of the BS can transmit the information request message by predetermined method, such as tunneling for connecting the MAC of the BS to the information server or MIH object. And, if there is no MIH in the BS and if the MAC of the BS should transmit this MIH frame, the MAC of the BS should understand the TLV included in MOB-MIH-MSG, and transmit to the corresponding object.

Back to the FIG. 10, the MAC of the BS transmits MOB_MIH_MSG comprising MIH frame to the MAC of the MS at the timing indicated by the cycle (step (22)). And, the MAC of the MS transmits MIH frame to the MIH of the MS through C-MIH-NOTIFY (step (23)), and the MIH of the MS transmits the MIH frame to the upper layer through MIH_Get.information (step (24)).

Figure 11:
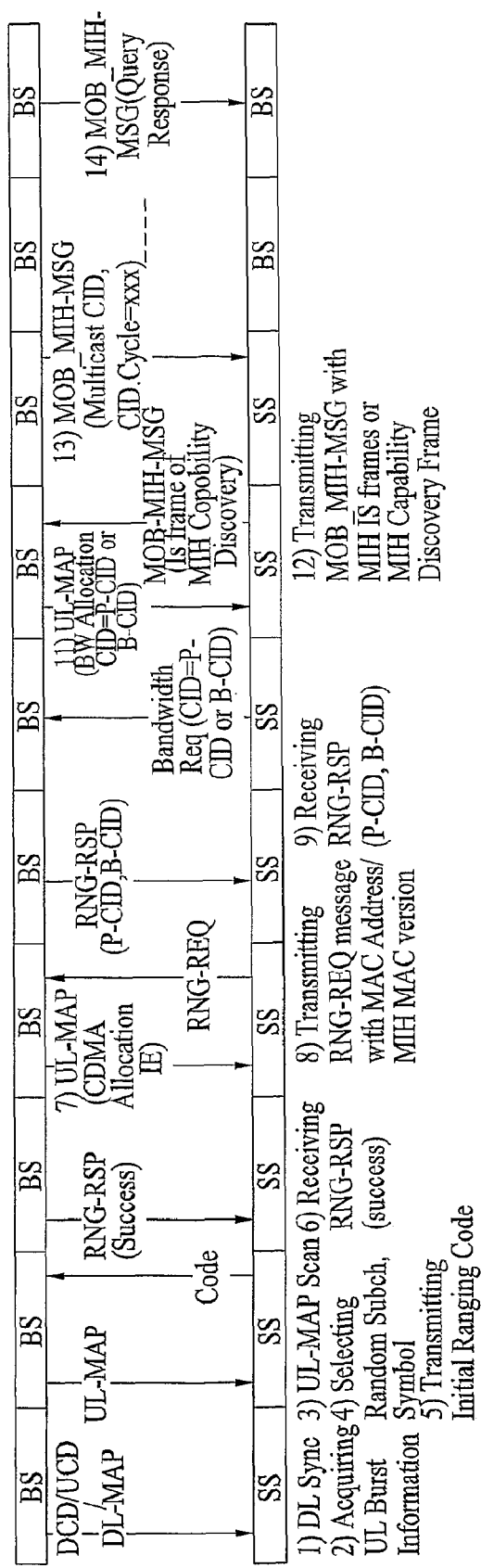
FIG. 11 shows an example of procedure similar to the FIG. 10, but it shows only the MAC procedure between MS and BS according to frame synchronization.

On the other hand, the FIG. 11 shows an example of procedure similar to the FIG. 10, but it shows only the MAC procedure between MS and BS according to frame synchronization.

Figure 12:
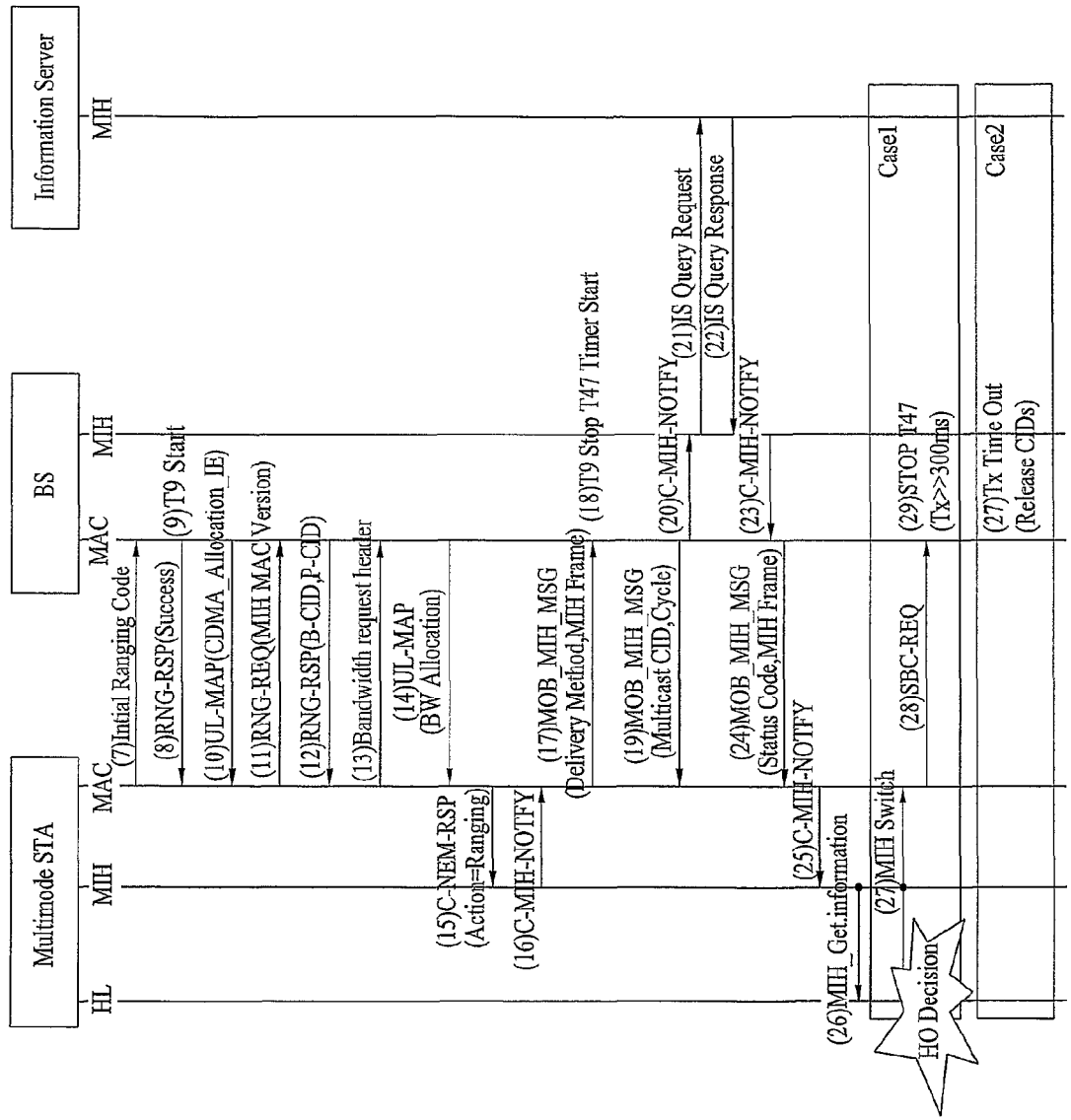
FIG. 12 shows another example of method for acquiring information about handover between heterogeneous networks by multicast method, while performing ranging process using MIH MAC version, by MS with BS of broadband wireless access network.

And, FIG. 12 shows another example of method for acquiring information about handover between heterogeneous networks by multicast method, while performing ranging process using MIH MAC version, by MS with BS of broadband wireless access network.

The steps (1)-(6) not shown in the FIG. 12 are same to the steps of FIG. 10, so these steps are omitted for efficiency.

The MS transmits an initial ranging code randomly selected among ranging code group classified by UCD message received through steps (1)-(6) (step (7)). The MS keeps adjusting uplink transmission parameters and timing value, until it receives 'success' signal from the BS.

On the other hand, in contrast to the FIG. 10, the BS starts T9 timer (step (9)), and the MS should perform registration process through SBC-REQ before the timer T9 expires.

The BS allocates uplink bandwidth through CDMA_Allocation_IE, for the MS to transmit MAC address and MAC version, by transmitting UL-MAP (step (10)). Then, the MS transmits MAC address and MAC version to the BS through RNG-REQ message (step (11)). The BS receiving MIH MAC version thinks that the MS is capable of initiating the MIH communication, and allocates basic CID (B-CID) and primary CID (P-CID) through RNG-RSP message (step (12)). Here, the MIH communication means information service and MIH capability discover service excepting event service and command service, because the MS does not finish the authentication process with the BS.

The MS transmits bandwidth request header using basic CID and primary CID according to the size of the MIH frame received from the upper layer, and this is for requesting resource for transmitting MIH frame (step (13)). The BS requested for bandwidth indicates uplink resource through UL-MAP (step (14)).

The MAC of the MS indicates the MIH that it finished MIH ranging process and preparation for transmitting MIH frame for requesting information, through C-NEM_RSP primitive (step (15)). So, the MIH of the MS transmits MIH frame comprising information element (received at the step 5 of the FIG. 10) to the MAC through C-MIH_NOTIFY (step (16)). The MAC of the MS transmits MIH frame to the MAC of the BS using basic CID and primary CID, as well as transmits the preferred delivery method of the response MIH frame (step (17)).

The BS receiving MOB_MIH-MSG stops the T9 timer, and starts T47 timer (step (18)). This is for the BS to release basic CID and primary CID if it does not receive SBC-REQ until the T47 timer expires.

The BS transmits query ID and cycle to the MS (step (19)). The cycle is for indicating the MS the frame cycle which the MS should monitor, for the MS to save its power consumption. The MS can save its power consumption by changing its mode to power saving mode when the frame is not the frame indicated by the cycle information.

The BS confirms it can transmit the response to the query, and if the BS decides that it is possible to transmit the response to the query and if the multicast method is used, the BS transmits MOB_MIH-MSG comprising the response to the query to the MS at the frame indicated by the cycle. On the other hand, the BS confirms it can transmit the response to the query, and if the BS decides that it is possible to transmit the response to the query and if the unicast method is used, the BS transmits MIH-Polling_IE through the UL-MAP, allocates uplink bandwidth for the MS to response at the frame indicated by the cycle. The method of using unicast delivery method will be discussed later with another figure.

The timing of transmitting the response or polling the MS when the BS is prepared is the first cycle after the BS is prepared. In this embodiment, the BS selects the delivery method as multicast method, and transmits MIH frame using multicast CID. The multicast CID is included in the MIH frame when the delivery method is selected as multicast. Here, the BS can also transmit query retry counter which is further included in the MIH frame. This counter is for the MS to decide that there is an error, when the MS counts the number of cycle until the response to the query is received, and when the MS does not receive the response until the number of cycle counted is over the query retry counter, if the delivery method is multicast method. On the other hand, if the unicast method is used, this counter is for indicating the BS the number of retry when the BS polls the MS at the first cycle after the BS finishes preparing for the response to the query, and when the MS does not response to the polling. If the MS does not response to the polling until the number of retry is exceed the number indicated by the query retry counter, the BS decides that the MS moved away or similar, so the MS is not available to response.

Back to the FIG. 12, the BS receives MIH frame comprising information element acquired from requesting and responding to/from the information server (steps (20-(23)). If requiring and responding about the capability of the MIHF, at steps (17), (20) and (21), the MIH_Capability_Discovery.request frame is transmitted to MIH object, not to the information server, and the response in the steps (22), (23) and (24) comprises MIH_Capability_Discover.response frame.

In this embodiment, the MIH of the BS relays request and/or response message between information server (or MIH object) and MS. But, in another embodiment of this invention, the MAC of the BS can transmit the information request message by predetermined method, such as tunneling for connecting the MAC of the BS to the information server or MIH object. And, if there is no MIH in the BS and if the MAC of the BS should transmit this MIH frame, the MAC of the BS should understand the TLV included in MOB-MIH-MSG, and transmit to the corresponding object.

The BS multicasts MOB_MIH-MSG comprising MIH frame received from the information server at every cycle frame. If the BS is not prepared for transmitting the response, the BS does not transmit anything at the corresponding frame. The MS starts the query retry counter at the first cycle after the MS transmits the query. The MS monitors the frame indicated by the cycle until the MS finds the response to the query, but the maximum number of cycles corresponds to the query retry counter.

The response to the query may not comprise the query ID, and it can be fragmented and be transmitted through several MAC frames (step (24)). The MAC of the MS transmits the MIH frame to the MIH through C-MIH-NOTIFY (step (25)), and the MIH of the MS transmits ot to the upper layer through MIH_Get.information (step (26)).

If the upper layer receiving the MIH frame decides to handover to the corresponding BS (Case 1), it transmits the MIH_Switch command for the MAC layer to establish L2 link (step (27)). The MAC layer transmits SBC-REQ to the BS, and initiates the basic capability negotiation (step (28)). The BS receiving the SBC-REQ stops the T47 timer, and performs operation using the allocated CID (step (29)).

But, the upper layer of the MS receiving the MIH frame decides not to handover to the corresponding BS (Case 2), the MS does not transmit anything to the BS. If the BS does not receive the SBC-REQ until the T47 timer is expired, the BS release basic CID, primary CID and management CID excepting the multicast CID (step (27)).

Figure 13:
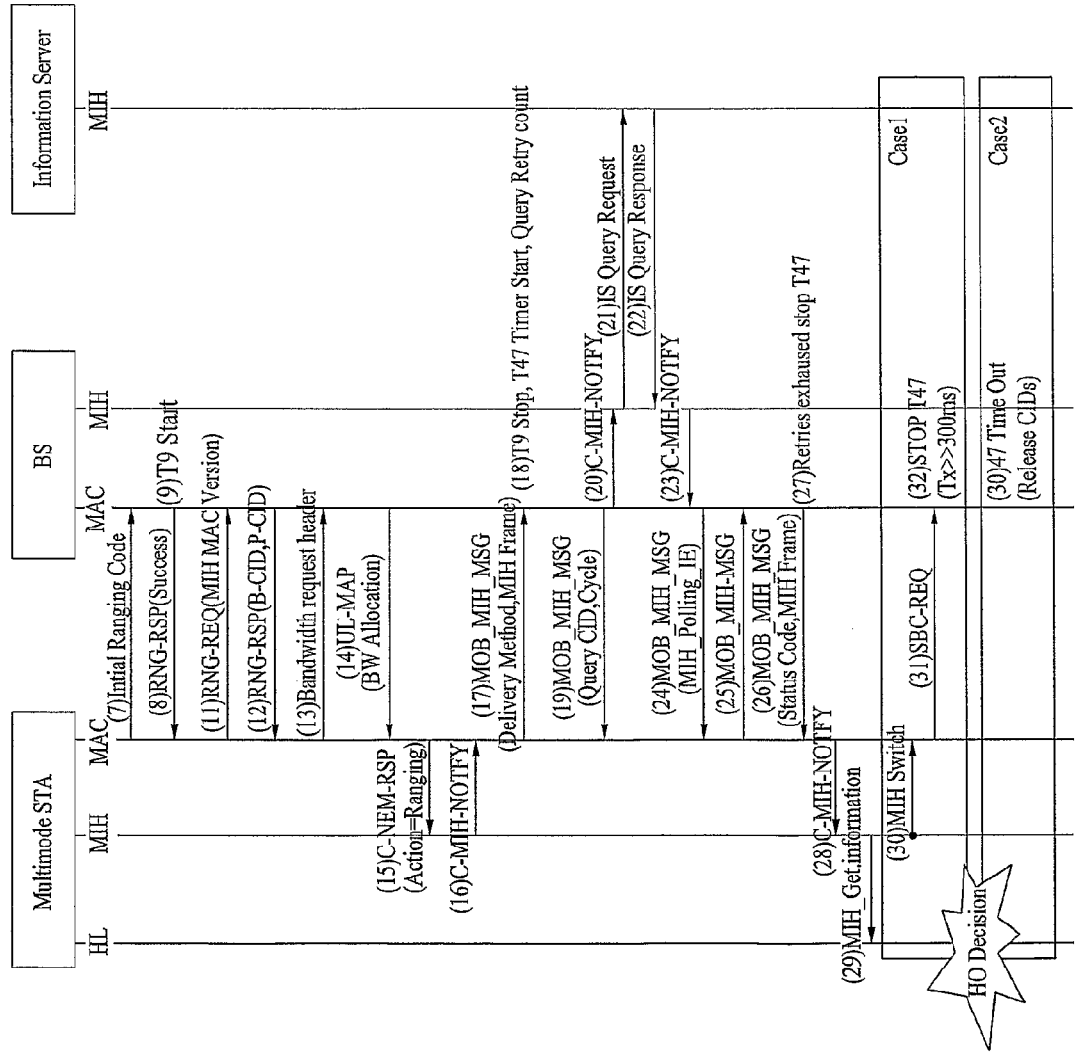
FIG. 13 shows another example of method for acquiring information about handover between heterogeneous networks by unicast method, while performing ranging process using MIH MAC version, by MS with BS of broadband wireless access network.

FIG. 13 shows another example of method for acquiring information about handover between heterogeneous networks by unicast method, while performing ranging process using MIH MAC version, by MS with BS of broadband wireless access network.

The steps (1)-(6) not shown in the FIG. 13 are same to the steps of FIG. 10, so these steps are omitted for efficiency.

The MS transmits an initial ranging code randomly selected among ranging code group classified by UCD message received through steps (1)-(6) of FIG. 10 (step (7)). The MS keeps adjusting uplink transmission parameters and timing value, until it receives 'success' signal from the BS.

The BS starts T9 timer (step (9)), and the MS should perform registration process through SBC-REQ before the timer T9 expires.

The BS allocates uplink bandwidth through CDMA_Allocation_IE, for the MS to transmit MAC address and MAC version, by transmitting UL-MAP (step (10)). Then, the MS transmits MAC address and MAC version to the BS through RNG-REQ message (step (11)). The BS receiving MIH MAC version thinks that the MS is capable of initiating the MIH communication, and allocates basic CID (B-CID) and primary CID (P-CID) through RNG-RSP message (step (12)). Here, the MIH communication means information service and MIH capability discover service excepting event service and command service, because the MS does not finish the authentication process with the BS.

The MS transmits bandwidth request header using basic CID and primary CID according to the size of the MIH frame received from the upper layer, and this is for requesting resource for transmitting MIH frame (step (13)). The BS requested for bandwidth indicates uplink resource through UL-MAP (step (14)).

The MAC of the MS indicates the MIH that it finished MIH ranging process and preparation for transmitting MIH frame for requesting information, through C-NEM_RSP primitive (step (15)). So, the MIH of the MS transmits MIH frame comprising information element received to the MAC through C-MIH_NOTIFY (step (16)). The MAC of the MS transmits MIH frame to the MAC of the BS using basic CID and primary CID, as well as transmits the preferred delivery method of the response MIH frame (step (17)).

The BS receiving MOB_MIH-MSG stops the T9 timer, and starts T47 timer (step (18)). This is for the BS to release basic CID and primary CID if it does not receive SBC-REQ until the T47 timer expires.

The BS can set query retry counter, and transmit it to the MS. This counter is for indicating the BS the number of retry when the BS polls the MS through MIH_Polling_IE at the first cycle after the BS finishes preparing for transmitting the response to the query, and when the MS does not response to the polling. If the MS does not response to the polling until the number of retry is exceed the number indicated by the query retry counter, the BS decides that the MS moved away or similar, so the MS is not available to response, that is the BS decides that it has an error. If the BS decided that the MS is not available, the BS stops T47 timer, and releases the allocated basic CID and primary CID (step (27)).

Back to the FIG. 13, the BS transmits query ID and cycle to the MS (step (19)). The cycle is for indicating the MS the frame cycle which the MS should monitor, for the MS to save its power consumption, and the BS can poll only at the frame indicated by the cycle. The MS can save its power consumption by changing its mode to power saving mode or the MS can search other BS, when the frame is not the frame indicated by the cycle information.

And, the BS transmits MOB_MIH-MSG and decides the delivery method as unicast method (step (19)). After that, the BS receives MIH frame comprising information element acquired from requesting and responding to/from the information server (steps (20-(23)). If requiring and responding about the capability of the MIHF, at steps (17), (20) and (21), the MIH_Capability_Discovery.request frame is transmitted to MIH object, not to the information server, and the response in the steps (22), (23) and (24) comprises MIH_Capability_Discover.response frame.

In this embodiment, the MIH of the BS relays request and/or response message between information server (or MIH object) and MS. But, in another embodiment of this invention, the MAC of the BS can transmit the information request message by predetermined method, such as tunneling for connecting the MAC of the BS to the information server or MIH object. And, if there is no MIH in the BS and if the MAC of the BS should transmit this MIH frame, the MAC of the BS should understand the TLV included in MOB-MIH-MSG, and transmit to the corresponding object.

The BS acquiring MIH frame comprising information element can transmit MIH_Polling_IE comprising the allocated uplink resource information in the UP-MAP at the first cycle after the BS acquires the MIH frame (step (24)). The MS can respond to this without any bandwidth request using bandwidth request header, by using the allocated uplink resource indicated in the MIH_Polling_IE. The MS receiving MIH_Polling_IE can transmit MOB_MIH-MSG comprising query ID (step (25)). Then, the BS transmits the MIH frame with status code (step (26)). If the MIH frame is transmitted by unicast method using primary CID, the MOB_MIH-MSG can be fragmented using fragmentation sub header.

The MAC of the MS transmit this MIH frame through C-MIH_NOTIFY (step (28)), the MIH of the MS transmits it to the upper layer through MIH_Get.information (step (29)). When the upper layer receiving MIH frame decides to handover to the corresponding BS (Case 1), it transmits the MIH_Switch command for the MAC layer to establish L2 link (step (30)). The MAC layer transmits SBC-REQ to the BS, and initiates the basic capability negotiation (step (31)). The BS receiving the SBC-REQ stops the T47 timer, and performs operation using the allocated CID (step (32)).

But, the upper layer of the MS receiving the MIH frame decides not to handover to the corresponding BS (Case 2), the MS does not transmit anything to the BS. If the BS does not receive the SBC-REQ until the T47 timer is expired, the BS release basic CID, primary CID and management CID excepting the multicast CID (step (30)).

Figure 14:
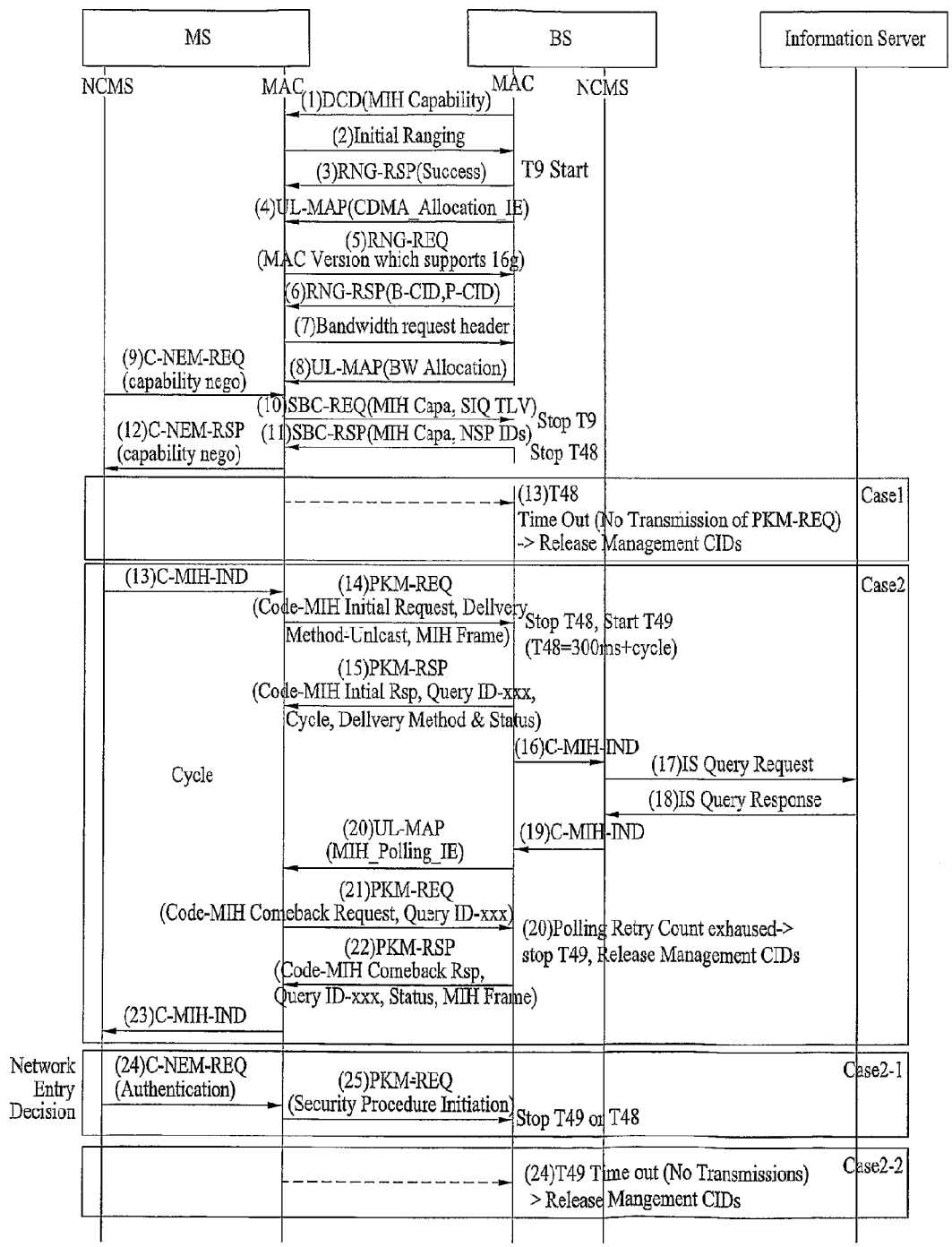
FIG. 14 shows another exemplary method for the BS to transmit information for selecting network to the MS through unicast delivery method, while the multimode MS is performing network entry process to the BS of broadband wireless access network.

FIG. 14 shows another exemplary method for the BS to transmit information for selecting network to the MS through unicast delivery method, while the multi-mode MS is performing network entry process to the BS of broadband wireless access network.

The steps (1)-(7) of this exemplary method are same to the steps of FIG. 13, so these steps will not be described here. But, the step (5) of this figure is slightly different from the step (5) of the FIG. 13 in the RNG-REQ message which comprises MAC version supporting 802.16g. And, the MAC version supporting 802.16g can comprise the function of supporting 802.21 MIH.

The upper layer of the MS, which finished the ranging process, transmits C-NEM-REQ (Action type=capability negotiation) indicating basic capability negotiation to the MAC of the MS (step (9)). The MAC of the MS receiving C-NEM-REQ transmits SBC-REQ message to the BS (step (10)). Here, this SBC-REQ message can comprise MIH capability information and SIQ TLV which indicates request for information to the network service provider. After receiving the SBC-REQ message, the BS stops T9 timer. And, the BS can transmit SBC-RSP message comprising MIH capability information and IDs of the network service providers (NSP IDs) (step (11)). Here, the BS starts T48 timer for managing CID. Then, the MS transmits the received information to the upper layer through C-NEM-RSP (Action type=capability negotiation) (step (12)).

After the step 12, this embodiment will be described as divided in 3 cases. First, the Case 1 is that the MS does not request further information to the BS to which the MS is trying to enter. Second, the Case 1-1 (which is not shown in the FIG. 14) is that the MS select the network only using information the MS received until present (the state of receiving NSP ID through SBC-RSP message). And, third, the Case 2 is that the MS request further information to the BS. In the later, the case 2 can be divided as case 2-1 and case 2-2, both will be described herein.

In case 1, if the MAC of MS, receiving NSP IDs, does not access to the present network until T48 timer is expired, or if the MS, at any reason, does not transmit PKM-REQ message which should be transmitted after SBC, the BS release the CIDs allocated to the MS (step (13)).

Next, the case 1-1 (not shown in the figure) is the case which the MS select network only using NSP IDs and the information received until present, and the MS further process network entry process with present network. So, the MS can performs steps (24)-(25) of the case 2-1 right after the step (12), and the BS ends T48 timer.

In case 2, the upper layer of the MS transmits MIH frame and MIHF frame type which indicates the context of the MIH frame for requesting information (ex, information for MIH capability or network selection) to the MAC (step (13)). The MAC of the MS transmits PKM-REQ message comprising MIH frame and preferred delivery method to the BS (step (14)). The PKM-REQ message, at this step, is can have a code as 'MIH initial request (code=31; according to the above table 36)', and this type of PKM-REQ message, according to on embodiment of this invention, is as shown in the above table 37.

The BS, receiving this PKM-REQ message, stops T48 timer, and starts T49 timer for managing CID at timing for the MS to retry for requesting information.

The MAC of the BS transmits PKM-RSP message comprising status code for the query, the delivery method for response to the query, the cycle information for indicating the timing for receiving the response to the query, and query ID for correlating the query with the response to the query (step (15)). This type of PKM-RSP message can have a code as 'MIH initial response' or 'MIH acknowledge'.

If the MS does not receive the MIH_Polling_IE (which can be called differently) from the BS until the timing the cycle information indicates, the MS waits until the next cycle, and this can be continued until 3 cycles. If the MS does not receives the MIH_Polling_IE until 3 cycles, the MS can transmit PKM-REQ (comeback request) requesting bandwidth to the BS for confirming status of the BS, or the MS can end the process of acquiring information for network selection, because the BS cannot response to the query.

The BS acquires the information for selecting network provided by 802.21 through the steps (16)-(19), and the timing of initiating the step (16) can be earlier than the timing of initiating the step (15). Then, the BS transmits MIH_Polling_IE through UL-MAP at first cycle after the BS acquires the information element, and this message indicates that the BS is ready for transmitting the response to the query, and can comprise information for the allocated uplink resource.

The MS can transmit PKM-REQ message using the allocated uplink resource indicated by the MIH_Polling_IE, without requesting bandwidth using bandwidth request header to the BS (step (21)). If the BS does not receive the PKM-REQ message through the allocated uplink resource, the BS can transmit the MIH_Polling_IE until 3 times, and if the BS does not receive the PKM-REQ message until that 3 times, the BS releases all the management CID of the MS (step (20)). The MAC of the MS transmits the PKM-REQ message (code=MIH comeback query request) to the BS, using the same PKM query ID to the ID used in the initial request (code=MIH initial query request) (step (21)). The BS transmits PKM-RSP message comprising MIH frame acquired and status information for the status of the query and the response (status code) (step (22)). The Mac of the MS transmits the received MIH frame to the upper layer using the C-MIH-IND (step (23)).

The rest steps of the case 2 after the step (23) will be described as case 2-1 and case 2-2. The case 2-1 is the case the MS wants to select BS which is performing network entry process based on the information acquired from the 802.21 information server, and to continue the network entry process. And, the case 2-2 is the opposite case.

In case 2-1, the upper layer of the MS transmits C-NEM-REQ (Action type=Authentication) for initiating the authentication process to the MAC, when the MS selects the network based on the received information from the 802.21 information server (step (24)). The MAC of the MS transmits PKM-REQ message for authentication process to the BS, and the BS receiving this message stops T49 timer, and continues to perfume the network entry process, such as transmitting PKM-RSP (step (25)).

On the other hand, in case 2-2, if the BS does not receive any message from the MS, the BS releases the management CIDs allocated to the MS (step (25)).

Figure 15:
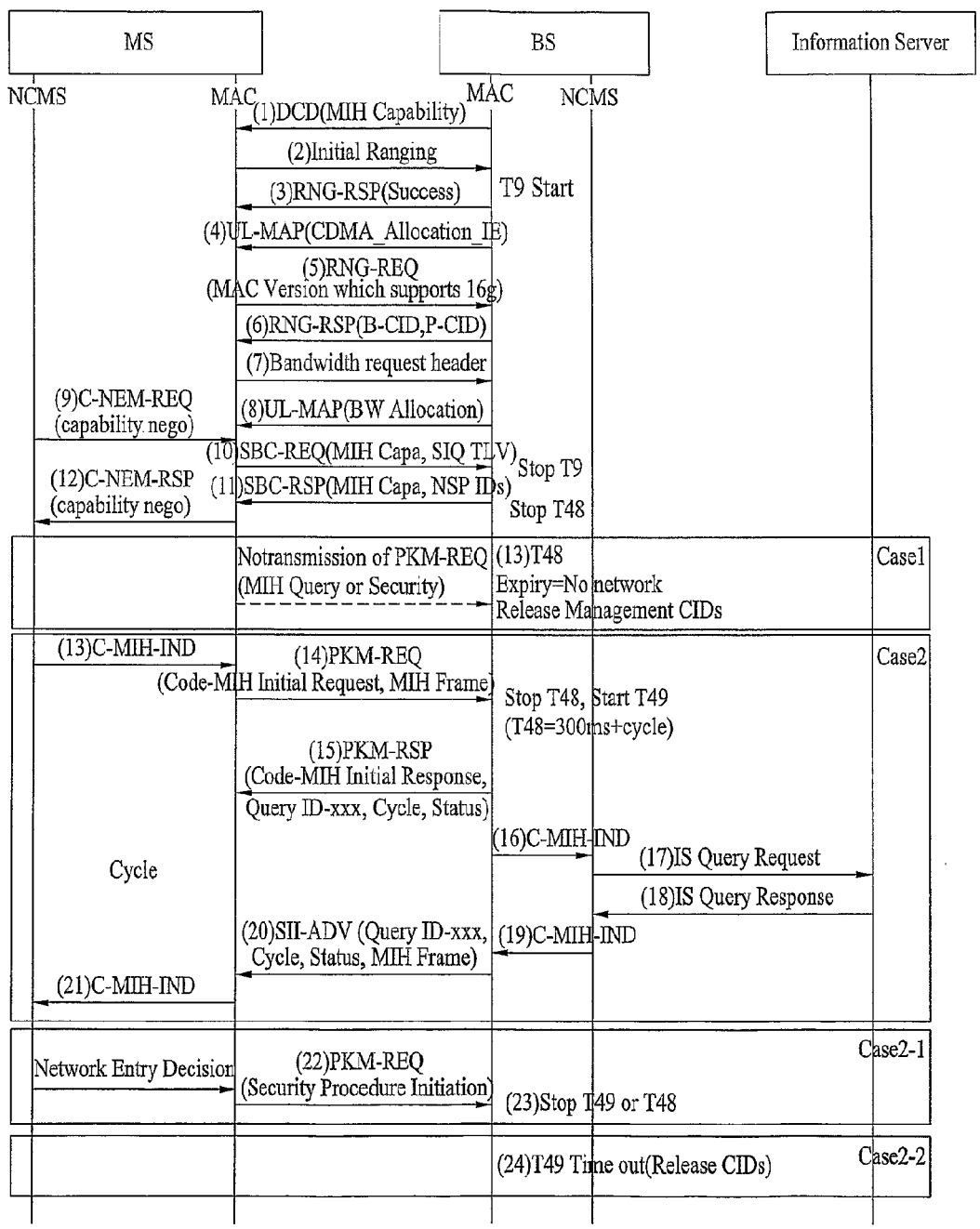
FIG. 15 shows another exemplary method for the BS to transmit information for selecting network to the plurality of MSs through multicast delivery method, while the multimode MS is performing network entry process to the BS of broadband wireless access network.

FIG. 15 shows another exemplary method for the BS to transmit information for selecting network to the plurality of MSs through multicast delivery method, while the multimode MS is performing network entry process to the BS of broadband wireless access network.

The steps (1)-(7) this exemplary method are same to the steps of FIG. 13, so these steps will not be described here. But, the step (5) of this figure is slightly different from the step (5) of the FIG. 13 in the RNG-REQ message which comprises MAC version supporting 802.16g. And, the MAC version supporting 802.16g can comprise the function of supporting 802.21 MIH.

The upper layer of the MS which finishes the ranging process transmits C-NEM-REQ (Action type=capability negotiation) indicating basic capability negotiation to the MAC of the MS (step (9)). The MAC of the MS receiving C-NEM-REQ transmits SBC-REQ message to the BS (step (10)). Here, this SBC-REQ message can comprise MIH capability information and SIQ TLV which indicates request for information to the network service provider. After receiving the SBC-REQ message, the BS stops T9 timer. And, the BS can transmit SBC-RSP message comprising MIH capability information and IDs of the network service providers (NSP IDs) (step (11)). Here, the BS starts T48 timer for managing CID. Then, the MS transmits the received information to the upper layer through C-NEM-RSP (Action type=capability negotiation) (step (12)).

After the step 12, this embodiment will be described as divided in 3 cases. First, the Case 1 is that the MS does not request further information to the BS to which the MS is trying to enter. Second, the Case 1-1 is that the MS select the network only using information the MS received until present (the state of receiving NSP ID through SBC-RSP message). And, third, the Case 2 is that the MS request further information to the BS.

In case 1, if the MAC of MS receiving NSP IDs does not access to the present network until T48 timer is expired, or if the MS, at any reason, does not transmit PKM-REQ message which should be transmitted after SBC, the BS release the CIDs allocated to the MS (step (13)).

Next, the case 1-1 (not shown in the figure) is the case which the MS select network only using NSP IDs and the information received until present, and the MS further process network entry process with present network. So, the MS can performs steps (21)-(22) of the case 2-1 right after the step (12), and the BS ends T48 timer.

In case 2, the upper layer of the MS transmits MIH frame and MIHF frame type which indicates the context of the MIH frame for requesting information (ex, information for MIH capability or network selection) to the MAC (step (13)). The MAC of the MS transmits PKM-REQ message comprising MIH frame and preferred delivery method to the BS (step (14)). The BS receiving this PKM-REQ message stops T48 timer, and starts T49 timer for managing CID at timing for the MS to retry for requesting information.

The MAC of the BS transmits PKM-RSP message comprising status code for the query, the delivery method for response to the query, the cycle information for indicating the timing for receiving the response to the query, and query ID for correlating the query with the response to the query (step (15)).

If the MS does not receive the SII-ADV from the BS until the timing the cycle information indicates, the MS waits until the next cycle, and this can be continued until 3 cycles. If the MS does not receives the SII-ADV until 3 cycles, the MS can transmit PKM-REQ (initial request) requesting bandwidth to the BS for confirming status of the BS, or the MS can end the process of acquiring information for network selection, because the BS cannot response to the query.

The BS acquires the information for selecting network provided by 802.21 through the steps (16)-(19), and the timing of initiating the step (16) can be earlier than the timing of initiating the step (15). Then, the BS transmits SII-ADV by multicast method at first cycle after the BS acquires the information element, and this multicast message can comprise the status information (status code) for indicating status of query and response (step (20)). The MAC of the MS transmits the received MIH frame through C-MIH-IND (step (21)).

The rest of the steps of case 2 after the step (21) will be described as case 2-1 and case 2-2. The case 2-1 is the case the MS wants to select BS which is performing network entry process based on the information acquired from the 802.21 information server, and to continue the network entry process. And, the case 2-2 is the opposite case. And, the rest steps of the case 2-1 and case 2-2 are same to the FIG. 14.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from above description, the present invention makes it possible for the multi-mode MS to acquire information for handover between heterogeneous networks before it finishes the network entry process, such as the authentication process.

The invention claimed is:

1. A method for acquiring information for media independent handover (MIH) by a mobile station (MS), the method comprising:
submitting an MIH query to a base station (BS) by sending a private key management request (PKM-REQ) message as a first request message, wherein the PKM-REQ message comprises an MIH function (MIHF) frame encapsulating the MIH query;
receiving a privacy key management response (PKM-RSP) message as a first response message comprising cycle information; and
receiving a second response message comprising a response to the MIH query,
wherein the cycle information indicates when the response to the MIH query is ready for delivery to the MS.

2. The method according to claim 1, wherein:
the first response message further comprises a query identifier (ID) and delivery method information;
the query ID is used by the MS to correlate the MIH query with the response to the MIH query; and
the delivery method information indicates a delivery method that is used by the BS.

3. The method according to claim 2, wherein the delivery method information indicates whether the delivery method used by the BS is a unicast delivery method or a broadcast delivery method.

4. The method according to claim 3, wherein, when the delivery method information indicates the unicast delivery method, receiving the second response message comprises:
receiving uplink map information for allocating bandwidth in a Medium Access Control (MAC) frame indicated by the cycle information;
transmitting a second request message that indicates continued presence of the MS; and
receiving a PKM-RSP message as the second response message comprising the response to the MIH query.

5. The method according to claim 3, wherein, when the delivery method information indicates the broadcast delivery method, receiving the second response message comprises:
receiving a service identity information (SII) message as the second response message comprising the response to the MIH query in a Medium Access Control (MAC) frame indicated by the cycle information.

6. The method according to claim 1, wherein the method further comprises:
transmitting a basic capability request message before submitting the MIH query to the BS; and
receiving a basic capability response message before submitting the MIH query to the BS,
wherein at least the basic capability request message or the basic capability response message comprises information for indicating whether or not MIH capability is supported.

7. A method for delivering information for media independent handover (MIH) by a base station (BS), the method comprising:
receiving a privacy key management request (PKM-REQ) message as a first request message from a mobile station (MS), wherein the PKM-REQ message comprises an MIH function (MIHF) frame encapsulating an MIH query;
transmitting a private key management response (PKM-RSP) message as a first response message comprising cycle information; and
transmitting a second response message comprising a response to the MIH query,
wherein the cycle information indicates when the response to the MIH query is ready for delivery to the MS.

8. The method according to claim 7, wherein;
the first response message further comprises a query identifier (ID) and delivery method information;
the query ID is used by the MS to correlate the MIH query with the response to the MIH query; and
the delivery method information indicates a delivery method that is used by the BS.

9. The method according to claim 5, wherein the delivery method information indicates whether the delivery method used by the BS is a unicast delivery method or a broadcast delivery method.

10. The method according to claim 9, wherein, when the delivery method information indicates the unicast delivery method, transmitting the second response message comprises:

transmitting uplink map information for allocating bandwidth in a Medium Access Control (MAC) frame indicated by the cycle information;

receiving a second request message that indicates continued presence of the MS; and transmitting a PKM-RSP message as the second response message comprising the response to the MIH query.

11. The method according to claim 9, wherein, when the delivery method information indicates the broadcast delivery method, transmitting the second response message comprises:

transmitting a service identity information (SII) message as the second response message comprising the response to the MIH query in a Medium Access Control (MAC) frame indicated by the cycle information.

12. The method according to claim 7, wherein the method further comprises:

receiving a basic capability request message before receiving the first request message; and transmitting a basic capability response message before receiving the first request message, wherein at least the basic capability request message or the basic capability response message comprises information for indicating whether or not MIH capability is supported.

* * * * *